(12) United States Patent
May

(10) Patent No.: US 10,247,627 B2
(45) Date of Patent: Apr. 2, 2019

(54) FORCE MEASUREMENT DEVICE

(71) Applicant: Torque And More (TAM) GmbH, Starnberg (DE)

(72) Inventor: Lutz May, Berg (DE)

(73) Assignee: Torque And More (TAM) GmbH, Stranberg (DE)

(*) Notice: Subject to any disclaimer, the term of this patent is extended or adjusted under 35 U.S.C. 154(b) by 0 days.

(21) Appl. No.: 15/544,491

(22) PCT Filed: Nov. 4, 2015

(86) PCT No.: PCT/EP2015/075751
§ 371 (c)(1),
(2) Date: Jul. 18, 2017

(87) PCT Pub. No.: WO2016/119931
PCT Pub. Date: Aug. 4, 2016

(65) Prior Publication Data
US 2018/0266897 A1   Sep. 20, 2018

(30) Foreign Application Priority Data
Jan. 29, 2015  (EP) .................................... 15153085

(51) Int. Cl.
*G01L 1/00* (2006.01)
*G01L 1/12* (2006.01)
*G01L 3/10* (2006.01)

(52) U.S. Cl.
CPC ............. *G01L 1/127* (2013.01); *G01L 3/101* (2013.01); *G01L 3/105* (2013.01)

(58) Field of Classification Search
CPC .......... G01L 1/127; G01L 3/105; G01L 3/101

USPC ..................................................... 73/862.381
See application file for complete search history.

(56) References Cited

U.S. PATENT DOCUMENTS

| 4,566,338 A * | 1/1986 | Fleming ................. G01L 3/102 324/209 |
| 4,811,609 A | 3/1989 | Nishibe et al. |
| 2016/0252415 A1* | 9/2016 | Lu ........................... G01L 3/102 73/862.333 |
| 2016/0313415 A1* | 10/2016 | Ruff .................... G01R 33/1215 |

FOREIGN PATENT DOCUMENTS

| EP | 136086 A2 * | 3/1985 |
| FR | 2 564 585 | 11/1985 |
| JP | S59/43323 | 3/1984 |

* cited by examiner

*Primary Examiner* — Max H Noori
(74) *Attorney, Agent, or Firm* — Fay Kaplun & Marcin, LLP

(57) ABSTRACT

A force measurement device may include a first magnetic field generating unit configured to generate a magnetic field for being applied to a test object; a first magnetic field sensing unit configured to sense the generated magnetic field; and a flux concentrator having a first pole, a second pole and a third pole. The first pole, the second pole and the third pole extend in the same direction. The first magnetic field generating unit is arranged at the first pole. The first magnetic field sensing unit is arranged at the second pole. A line enveloping a first end face of the first pole, a second end face of the second pole and a third end face of the third pole is concave shaped. A cross section of the first pole is greater than a cross section of the second pole and greater than a cross section of the third pole.

15 Claims, 17 Drawing Sheets

FORCE MEASUREMENT DEVICE

BACKGROUND

The present disclosure relates to a force measurement device, a force measurement arrangement and a method for measuring a force applied to an object. Particularly, the disclosure relates to a magnetic based force measurement device and a magnetic based method for measuring a force applied to an object allowing force measuring without the need of pre-processing the object.

TECHNICAL FIELD

Force measuring is important for many industrial applications, in particular for arrangements being dynamically impacted by a force. Applied forces may be pressuring forces as well as moments like torque and bending impact. An exemplary application for torque is a shaft for a vehicle being arranged between a motor and e.g. a wheel. For determining a torque in the shaft, either a particular element needs to be mounted to the shaft, or the shaft needs to be pre-processed, e.g. magnetized. Mounting elements to a shaft may influence the movement of the shaft, pre-processing may be difficult when the shaft is not accessible or cannot me dismounted for pre-processing.

BRIEF SUMMARY

There may be a need for a magnetic principle based mechanical force sensing technology with reduced electric power consumption and increased measuring accuracy.

According to a first aspect, a force measurement device is provided. The force measurement device comprises a first magnetic field generating unit configured to generate a magnetic field for being applied to a test object, a first magnetic field sensing unit configured to sense the generated magnetic field and a flux concentrator having a first pole, a second pole and a third pole. The first pole, the second pole and the third pole extend in the same direction. The first magnetic field generating unit is arranged at the first pole and the first magnetic field sensing unit is arranged at the second pole. A line enveloping a first end face of the first pole, a second end face of the second pole and a third end face of the third pole is concave shaped (said line extends along the first end face, second end face and third end face, i.e., it is an extrapolated tangent to these end faces). This line can be referred to as an envelope. A cross section of the first pole is greater than a cross section of the second pole and greater than a cross section of the third pole.

When referring to the cross section of the poles, reference is made in particular to the cross-sectional area of the poles, respectively. The cross-sectional area of the first pole is greater than the cross-sectional area of the second and third pole, respectively and thus enables a more intense magnetic field to be generated (in other words: it may enable a higher magnetic flux), as there is one pole with a magnetic field generating unit which generates a magnetic field to be detected by one or more magnetic field sensing units arranged on multiple different poles. The sum of the magnetic field lines sensed at the poles with the magnetic field sensing units is almost identical to the magnetic field lines emitted at the first pole with the magnetic field generating unit as a result of its increased cross-sectional area.

The force measurement device may further comprise a control unit which is adapted to determine a force applied to a test object based on the sensed magnetic field, particularly based on the intensity or direction of the magnetic field lines.

The poles of the flux concentrator extend in the same direction and may be substantially parallel. An envelope, for example an imaginary line which interconnects the free ends of the poles, is concave shaped. In other words, the envelope and/or end faces of the poles form a recess or an indent which is adapted to accommodate a test object.

In one embodiment, the poles may be of different lengths, i.e. at least one pole is shorter than the other two poles.

Due to the concave shape of the poles, a test object can be arranged such that an outer surface of the test object is closely surrounded by the poles, particularly by the end faces of the poles, and a distance between the test object and each of the poles is minimized. Thus, the measuring accuracy may be increased and the force measurement device may require less electrical power for carrying out force measurements.

The mere fact that the envelope is concave shaped does not necessarily mean that end faces of the poles are also concave shaped. The end faces of the poles may be flat and the concave shape of the envelope is formed by different lengths of the poles.

The force measurement device described herein is configured for non-contact measuring of torque forces and other mechanical forces from any Ferro-magnetic objects. The force measurement device shows huge measurement improvements: lower noise, no or almost no temperature drift, lower electric current consumption, and less distance sensitivity.

Mechanical force sensors are devices that can measure Torque Forces, Bending Forces, and Axial Load Forces. From all the possible physical principles available to measure mechanical forces (examples of 'indirect' measurement principles: Strain gage, Surface Acoustic Waves, Press-fit-ring Magneto-elasticity, Torsion Bar Principle, etc.), it may be one aspect of this description to describe a 'direct' measuring magnetic principle. "Direct" magnetic principle means that the mechanical force sensor is detecting and measuring the changes in the flux-line vectors when mechanical forces are applied to the Test-Object.

The Test-Object is the device to which forces are applied and which will be measured. The Test-Object can be a gearbox input shaft, a beam, a tube, or any other objects as long as this object has been tooled from Ferro-magnetic material.

For the magnetic principle based sensor system to work, a known magnetic field (strength and direction of the magnetic field) has to travel through the section in the Test-Object where the mechanical forces will be measured from. The magnetic field required will be generated by a magnetic field source, namely by the magnetic field generating unit. This magnetic field source can be either a Test-Objected embedded magnetic field (meaning that the Test-Object has been permanently magnetized), or is an external device that is actively injecting the magnetic field into the Test-Object when needed. For obvious reasons, the later of the two is here called "Active".

Contrary to the active measurement technique, the sensing technology where the Test-Object will be permanently magnetized may be called passive magnetic field source, or passive sensing technology.

An active mechanical force sensor can be treated as a stand-alone item that begins to fulfill its purpose (measuring mechanical forces) immediately when mounted to the Test-Object: no shaft magnetization is required, it cannot be damaged or harmed by larger magnetic stray fields and it is logistically a simple and low cost solution.

The active sensing technology is a magnetic principle based sensor system that is measuring the mechanical forces that are applied to the Test-Object. An Active Sensor System consists of a sensing module and the sensor electronics. An Active Sensor is injecting a known magnetic field into the Test-Object by the magnetic field generating unit and is measuring the resulting signal-returns by the magnetic field sensing unit. The magnetic flux between the Sensing Module and the Test-Object is modulated by the mechanical forces that travel through the Test-Object. The magnetic field that is injected into the Test-Object is actively generated, for example by an electric current flow in inductors.

The Test-Object is the device from which the measurements are taken. The Test-Object can be a flat beam, a round shaft or a hollow tube, for example. In any case, the Test-Object has to be tooled from Ferro-magnetic material. However, for the force measurement device described herein, the Test-Object does not have to have, but may have, magnetic retention properties. This is a very big difference when comparing with 'Passive' magnetic sensing principles. Test-Objects that have been hardened may provide better measurement results than unhardened Test-Objects (lower signal hysteresis, improved measurement linearity).

The force measurement device, also referred to as Active Mechanical Force Sensor, consists of a Sensing Module comprising the magnetic field generating and sensing units and the Sensor Electronics which may be referred to as control unit. Both are connected with each other by a number of wires. The connection wires can be several meters long.

The Sensing Module (which is part of the Sensor System) has to be placed nearest to the Test-Object and is the magnetic field 'transmitter' and the returning magnetic field 'receiver'. There are no active components used to build the Sensing Module. Inside the Sensing Module are only inductors (or coils) wound around a specially shaped Flux-concentrator, as described above and hereinafter.

In principle the Sensor Electronics, i.e. the control unit, can be placed at the same location as the Sensing Module. However, the Sensing Module may be placed by the user in locations that are exposed to harsh operating conditions, and/or at location with little space available. To protect the Sensor Electronics from potential harsh operating conditions (like high temperatures, oil spills, or water), the Sensor Electronics may be mounted in its own housing and away from the Sensing Module.

According to an embodiment, the line which envelops the first end face, the second end face and the third end face is circular.

This allows accommodating circular test objects like a shaft, wherein the poles are equidistantly located with reference to the circular test object. Particularly, this embodiment may allow contactless measuring of forces applied to a rotating shaft during operation of the test object or a machine comprising said rotating shaft.

According to a further embodiment at least one of the first end face, the second end face and the third end face is concave shaped.

Thus, the end faces of the poles are formed such that they adapt to an outer form of a test object, particularly to the outer surface of a round test object such that a distance between different points at the end face of the poles and the test object is virtually the same.

According to a further embodiment, the cross section of the first pole is equal to the sum of the cross sections of the second pole and the third pole.

Thus, the magnetic flux density within the flux concentrator may be even and there are no bottlenecks which may negatively influence the magnetic flux and therefore reduction of measurement accuracy and measurement performance may be avoided.

According to a further embodiment, a height of the first magnetic field generating unit is smaller than a diameter of the first magnetic field generating unit.

The same may apply to the first magnetic field sensing unit and to potentially additional magnetic field sensing units or to additionally used magnetic field generating units. A coil with a height that is larger than its diameter may act increasingly more as a signal damping element and the measuring signal may be influenced negatively in such a case.

According to a further embodiment, the height of the first magnetic field generating unit is between 60% and 75% of the diameter of the first magnetic field generating unit.

The same may apply to the first magnetic field sensing unit and to potentially additional magnetic field sensing units or to additionally used magnetic field generating units.

According to a further embodiment, a spacing between the first pole and the second pole is equal to or larger than the diameter of the second pole.

Thus, the magnetic field sensing and generating units can be designed as coils and located or wound around the poles. This spacing may enable an optimal magnetic flux between the poles in order to increase the measurement accuracy.

According to a further embodiment, the spacing between the first pole and the second pole is equal to or smaller than the diameter of the first pole.

In other words, the spacing between the first pole and the second pole may be preferably larger than the diameter of the second pole and smaller than the diameter of the first pole. The same may apply to the relation between the first pole and the third pole.

According to a further embodiment, a height of the first pole is between 50% and 75% of a height of the flux concentrator.

According to a further embodiment, one end (in particular a lower end) of the first magnetic field generating unit is spaced apart from the end face of the first pole between 0 mm and 3 mm.

Thus, the magnetic field lines are directed into the test object opposite to the first end face with low stray loss. The longer the pole is and the longer the section of the pole between the lower end of the magnetic field generating unit and the end face, the more stray losses may occur at this lower section of the pole.

According to a further embodiment, one end of the first magnetic field generating unit is flush with at least a section of the circumference of the first pole at the end face of the first pole.

The end face may not be an even surface extending orthogonally to the longitudinal direction of a pole. In particular, the end face may be inclined at an angle smaller than 90° relative to the longitudinal direction of a pole. If the magnetic field generating unit is a coil wound around the pole, the coil usually extends parallel to the pole and the ends of the coil are perpendicular)(90°) relative to the longitudinal direction of the pole. In case the end phase is inclined at an angle less than 90° relative to the longitudinal direction of the pole, the lower end of the coil may be arranged such that it is flush with a section of the circumference of the end face and the remaining section of the circumference of the end face is spaced apart from the lower end of the coil.

According to a further embodiment, a height of the first magnetic field generating unit is between 40% and 60% of a height of the flux concentrator.

According to a further embodiment, the height of the first magnetic field generating unit is 50% of the height of the flux concentrator.

According to a further embodiment, the first magnetic field sensing unit is a first coil, wherein the force measurement device further comprises a second magnetic field sensing unit, wherein the second magnetic field sensing unit is a second coil wound around the third pole and wherein an inductivity of the first coil is different from an inductivity of the second coil.

The inductivity of the first coil may differ from the inductivity of the second coil due to different numbers of windings or due to different geometrical dimensions of the first and second coils. Due to this mismatch, the measurement value of the first and second magnetic field sensing units is not 0 Volt if no force is applied to the test object, but the sensing units measure different voltage values. In other words, there is a measurement offset resulting from the winding mismatch. This enables determining of a direction in case of torque measurement. If the measurement value increases than the torque is applied in a first direction and if the measurement value first decreases and increases subsequently, it can be deduced that the torque is applied in the other direction. In the latter case, the offset value resulting from the winding mismatch is first eliminated before the measured value will increase again.

According to a further embodiment, the first coil comprises between 1% and 3% more windings than the second coil.

This small winding mismatch is enough to generate a measurement offset in case no force is applied and in order to determine whether the measurement value directly increases or first decreases when a force is applied, such that the direction of the applied force can be determined.

The flux concentrator as described above and hereinafter may comprise ferro-magnetic material having a high effective permeability, for example above 50. Said material may have a high impedance in order to reduce eddy current and may be suitable for AC frequency, preferable above 3 kHz.

According to one embodiment, the force measurement device may comprise a second magnetic field sensing unit which may for example be a coil wound around the third pole. Alternatively, the force measurement device may comprise a second magnetic field generating unit which may for example be a coil wound around the third pole.

Thus, the force measurement device may enable two measuring signals either at the magnetic field sensing site or at the magnetic field generating site. This may particularly enable determining a direction of an applied force and not an absolute value of the applied force only.

According to a further embodiment, a first connection line between the first pole and the second pole and a second connection line between the first pole and the third pole intersect at an angle between 80° and 100°. Particularly, the first and second connection lines intersect at an angle of 90°.

According to a further embodiment, a length of the third pole is equal to a length of the second pole.

According to a further embodiment, a length of the first pole is less than a length of the second pole.

Thus, the first pole forms the lowest point of the envelope or recess and enables placement of the force measurement device such that the first pole is perpendicular to a central axis of the test object and the second and third poles are laterally offset relative to the longitudinal axis of the test object each to one side of the test object.

According to a further embodiment, a length of the first pole is equal to a length of the second pole.

This may particularly be advantageous when the force measurement device is arranged such that no pole is exactly aligned with the central axis of the longitudinal object, i.e. all poles are laterally offset relative to the central axis of the test object.

According to a further embodiment, the first magnetic field generating unit is a coil wound around the first pole and the first magnetic field sensing unit is a coil would around the second pole.

According to a further embodiment, the force measurement device further comprises a second magnetic field sensing unit, wherein the second magnetic field sensing unit is a coil wound around the third pole or a second magnetic field generating unit, wherein the second magnetic field generating unit is a could wound around the third pole.

According to a further aspect, a force measurement arrangement is provided comprising a force measurement device as described above and hereinafter and a test object, wherein the force measurement device is arranged such that the test object is at least partially accommodated within a recess formed by the envelope of the flux concentrator.

Such a force measurement arrangement provides high accuracy force measurement as the poles of the flux concentrator are virtually equidistantly arranged relative to the surface of the test object.

The force measurement arrangement may be an arrangement located within a machine a part of which requires permanent or periodically recurring monitoring of forces during operation or during a test sequence.

According to an embodiment, the first pole extends in a direction perpendicular to a longitudinal central axis of the test object. The first pole may particular be arranged such that there is no lateral offset between the first pole and the longitudinal central axis of the test object. In case of a circular test object, the first pole extends in a direction perpendicular to at least a part of the outer surface of the test object.

According to a further embodiment, a connection line between the first pole and the second pole intersects the longitudinal central axis at an angle between 40° and 50°. Particularly, the connection line between the first pole and the second pole intersects the longitudinal central axis at an angle of 45°.

This embodiment may be advantageous when measuring negative or positive torque forces, i.e. torque forces in two different directions.

According to a further embodiment, the flux concentrator is arranged such that the first pole is laterally offset with respect to a longitudinal central axis of the test object.

In this embodiment, the second and third poles may also be laterally offset relative to the longitudinal central axis of the test object. This arrangement may be advantageous for measuring bending forces applied to the test object.

According to a further embodiment, a connection line between the first pole and the second pole intersects the longitudinal central axis at an angle between 1° and 5° or at an angle between 89° and 85°.

This arrangement may particularly provide a higher signal to noise ratio of the sensed magnetic field.

According to a further aspect, a method for measuring a force applied to a test object with a force measurement arrangement as described above and hereinafter is provided. The method comprises the steps of: applying an electric signal to the first magnetic field generating unit such that a magnetic field is generated; sensing the generated magnetic field when a force is applied to the test object; and determining a force applied to the test object based on the generated magnetic field and the sensed magnetic field.

In other embodiments, the method may comprise one or more of the following steps: generating a magnetic field with a second magnetic field generating unit; sensing the magnetic field with additional magnetic field sensing unit, for example with a second and/or a third and/or a fourth magnetic field sensing unit which may be coils wound around different poles of the flux concentrator.

Some characteristics and advantages of the force measurement device and the force measurement arrangement described herein may be the following:

The force measurement device enables differential-mode magnetic field sensing and has low signal noise (thus, no Flux-gate and much lower signal gain factor required), large usable signal modulations and almost no carrier signal anymore, good operating temperature performances, low signal gain within the sensor electronics, almost no temperature sensitivity of the measured signal. Particularly, there is no need for a flux-gate circuit and need for a special, high-sensitive, magnetic field sensing coil as well as of an electronic circuit that has to operate with its own signal clock (this signal clock is challenging to filter-out from the usable measurement signal) is eliminated. Simple electronic circuits can be used for the control unit which results in low costs.

Some of the performance improvements are: Low electric current consumption, the average electric current consumption may be between 25 mA to 50 mA; taw output-signal noise reduced well below 1 mVpp (without the use of additional filter circuits).

The required magnetic flux concentrator may be produced from standard Ferro-magnetic material using a laser printing method (rapid prototyping). The flux-concentrator may have a 3 or 5 pole shoe having a mechanically robust design and the coil assembly has been simplified as the coils can be pre-manufactured and then pushed-on (or simply inserted) onto the flux concentrator pole-ends.

The magnetic field generator circuit can be a simple rectangle-signal generator which makes this circuit smaller and cheaper to build.

There are several design options available to choose from. In one design option, the all of the built-in signal receiving coils (in the Sensing Module) are connected in series with each other so that only two wires need to be connected to the signal receiving electronics. The magnetic field generating coil is connected with two wires to the electronics transmitter circuit.

A three pole-end or a five pole-end flux-concentrator may be used. While a three pole-end flux-concentrator is smaller and cheaper to build, the five pole-end flux-concentrator offers significant performance improvements.

The force measurement device, also called sensing module, can emit a constant magnetic field or an alternating magnetic field. The signal detection can be done through pure signal amplitude comparisons (or measurements of signal amplitude changes, caused by the applied mechanical forces) or can be done by measuring the signal phase shifts (delays) of the returning, differential mode signals. The Sensing Module can be placed from one side onto the Test-Object. The Sensing Module does not have to circumvent (go around) the entire Test-Object. The Flux Concentrator inside the Sensing Module can be tooled from any Ferro-magnetic material, including steel, ferrite, and alloys that include Nickel and Chrome. The signals received from the Inductors inside the Sensing Module can be individually processed by a number of separate working signal conditioning circuit modules, or can be connected in series to each other and then passed-on to one electronic signal conditioning module. When using one signal conditioning electronics module for each signal receiving inductor, then the results of these individual electronic circuits will be processed further by comparing these signals with each other. The physical effect used in this measurement method is the angular turning (twisting) of magnetic flux lines (beneath the surface of the Test-Object) when applying mechanical stresses to the Test-Object. The direction a magnetic field runs inside a Ferro-magnetic object will be manipulated (influenced) be mechanical stresses that act on the magnetic domains inside the Test-Object. The changes in angular directions of the magnetic flux-lines also results in changes of the speed with which the magnetic flux is passing through the Test-Object in a specific direction. Applying differential mode signal processing of two independent signal sources to determine (measure or quantify) the phase delay or the amplitude signal changes between the two signals received. It may particularly not be required to magnetically saturate the flux concentrator before measuring an applied force to a test object as the force measurement device described herein may work from very little to near the magnetic saturation point.

FURTHER EXAMPLES

Example 1

Force measurement device, comprising:
a first magnetic field generating unit configured to generate a magnetic field for being applied to a test object;
a first magnetic field sensing unit configured to sense the generated magnetic field;
a flux concentrator having a first pole, a second pole and a third pole;
wherein the first pole, the second pole and the third pole extend in the same direction;
wherein the first magnetic field generating unit is arranged at the first pole;
wherein the first magnetic field sensing unit is arranged at the second pole;
wherein a line enveloping a first end face of the first pole, a second end face of the second pole and a third end face of the third pole is concave shaped;
wherein a cross section of the first pole is greater than a cross section of the second pole and greater than a cross section of the third pole.

Example 2

Force measurement device according to example 1,
wherein the line enveloping the first, second and third end face is circular.

Example 3

Force measurement device according to example 1 or 2,
wherein at least one of the first end face, the second end face and the third end face is concave shaped.

Example 4

Force measurement device according to any one of the preceding examples, wherein the cross section of the first pole is equal to the sum of the cross sections of the second pole and the third pole.

Example 5

Force measurement device according to any one of the preceding examples,
wherein a height of the first magnetic field generating unit is smaller than a diameter of the first magnetic field generating unit.

Example 6

Force measurement device according to example 5,
wherein the height of the first magnetic field generating unit is between 60% and 75% of the diameter of the first magnetic field generating unit.

Example 7

Force measurement device according to any one of the preceding examples,
wherein a spacing between the first pole and the second pole is equal to or larger than the diameter of the second pole.

Example 8

Force measurement device according to any one of the preceding examples,
wherein a spacing between the first pole and the second pole is equal to or smaller than the diameter of the first pole.

Example 9

Force measurement device according to any one of the preceding examples,
wherein a height of the first pole is between 50% and 75% of a height of the flux concentrator.

Example 10

Force measurement device according to any one of the preceding examples,
wherein one end of the first magnetic field generating unit is spaced apart from the end face of the first pole between 0 mm and 3 mm.

Example 11

Force measurement device according to any one of the preceding examples,
wherein one end of the first magnetic field generating unit is flush with at least a section of the circumference of the first pole at the end face of the first pole.

Example 12

Force measurement device according to any one of the preceding examples,
wherein a height of the first magnetic field generating unit is between 40% and 60% of a height of the flux concentrator.

Example 13

Force measurement device according to any one of the preceding examples,
wherein the height of the first magnetic field generating unit is 50% of the height of the flux concentrator.

Example 14

Force measurement device according to any one of the preceding examples,
wherein the first magnetic field sensing unit is a first coil;
wherein the force measurement device further comprises:
a second magnetic field sensing unit;
wherein the second magnetic field sensing unit is a second coil wound around the third pole;
wherein the first coil comprises more windings than the second coil.

Example 15

Force measurement device according to example 14,
wherein the first coil comprises between 1% and 3% more windings than the second coil.

Example 16

Force measurement device according to any one of the preceding examples,
wherein a first connection line between the first pole and the second pole and a second connection line between the first pole and the third pole intersect at an angle between 80° and 100°.

Example 17

Force measurement device according to any one of the preceding examples,
wherein a length of the third pole is equal to a length of the second pole.

Example 18

Force measurement device according to any one of the preceding examples,
wherein a length of the first pole is less than a length of the second pole.

Example 19

Force measurement device according to any one of examples 1 to 17,
wherein a length of the first pole is equal to a length of the second pole.

Example 20

Force measurement device according to any one of the preceding examples,
wherein the first magnetic field generating unit is a coil wound around the first pole;
wherein the first magnetic field sensing unit is a coil would around the second pole.

Example 21

Force measurement device according to any one of the examples 1 to 13 and 15 to 20, further comprising:
a second magnetic field sensing unit;
wherein the second magnetic field sensing unit is a coil wound around the third pole;

or a second magnetic field generating unit;

wherein the second magnetic field generating unit is a could wound around the third pole.

Example 22

Force measurement arrangement, comprising:

a force measurement device according to any one of the preceding examples; and a test object;

wherein the force measurement device is arranged such that the test object is at least partially accommodated within a recess formed by the envelope of the flux concentrator.

Example 23

Force measurement arrangement according to example 22, wherein the first pole extends in a direction perpendicular to a longitudinal central axis of the test object.

Example 24

Force measurement arrangement according to example 23, wherein a connection line between the first pole and the second pole intersects the longitudinal central axis at an angle between 40° and 50°.

Example 25

Force measurement arrangement according to example 22, wherein the flux concentrator is arranged such that the first pole is laterally offset with respect to a longitudinal central axis of the test object.

Example 26

Force measurement arrangement according to example 25, wherein a connection line between the first pole and the second pole intersects the longitudinal central axis at an angle between 1° and 5° or at an angle between 89° and 85°.

Example 27

Method for measuring a force applied to a test object with a force measurement arrangement according to any one of examples 22 to 26, comprising the steps of:

applying an electric signal to the first magnetic field generating unit such that a magnetic field is generated;

sensing the generated magnetic field when a force is applied to the test object;

determining a force applied to the test object based on the generated magnetic field and the sensed magnetic field.

BRIEF DESCRIPTION OF THE DRAWINGS

In the following for further illustration and to provide a better understanding of the present disclosure, exemplary embodiments are described in more detail with reference to the enclosed drawings, in which.

DETAILED DESCRIPTION

Figure 1:
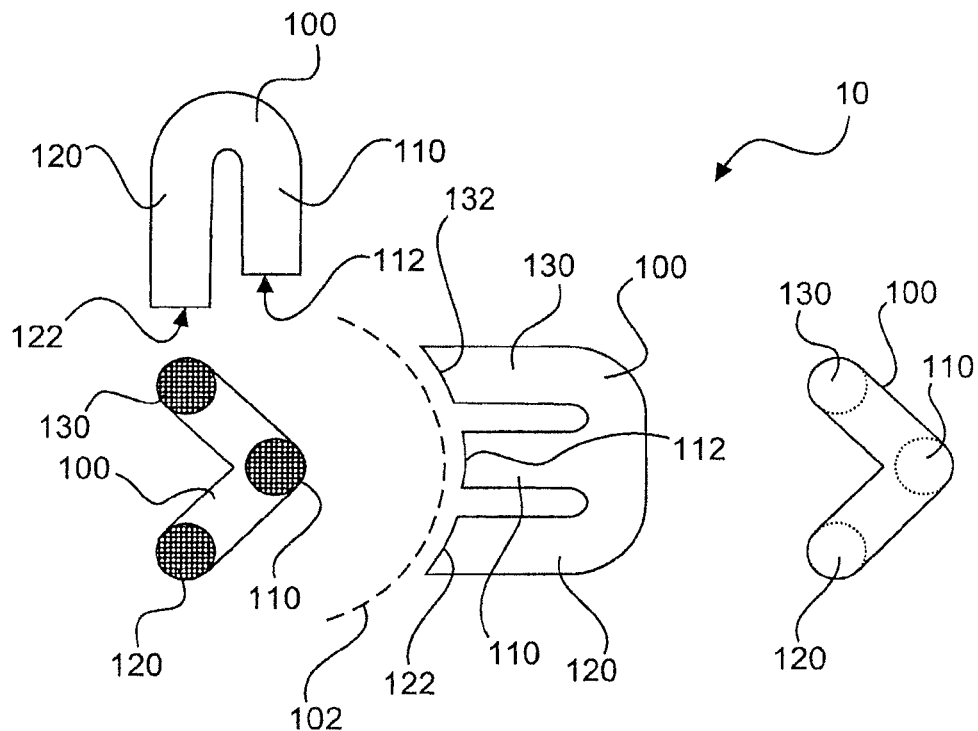
FIG. 1 shows a flux concentrator for a force measurement device.

FIG. 1 shows a flux concentrator 100 for a force measurement device 10 from different perspectives. A side view is shown in the upper left corner and a bottom view is shown directly underneath the side view. The front view is shaped like an E and is shown in the lower row in the middle and the top view is shown next to it on the right.

The flux concentrator 100 comprises three poles 110, 120, 130 each of which comprises an end face 112, 122, 132, respectively. The first pole 110 is shorter than the second and third poles 120, 130. An envelope 102, which may for example be described as a tangent along the end faces or tips of the poles 110, 120, 130 is concave shaped.

In the side view, the third pole is obscured by the second pole 120. In the top view and bottom view it can be seen that the poles are arranged similar to the corners of an isosceles triangle.

In this embodiment, two independent magnetic flux measurements are compared with each other and the difference between these two measurements is used to compute (or create) the sensor output signal.

In FIG. 1, a three pole-end flux concentrator is shown, seen from different angles. The pole-ends of the flux-concentrator will face the Test-Object. Using round corners assures that there are limited to none magnetic stray fields that emanates from the flux concentrator body at the wrong places. The active measurements are taken place between the pole-ends.

Figure 2:
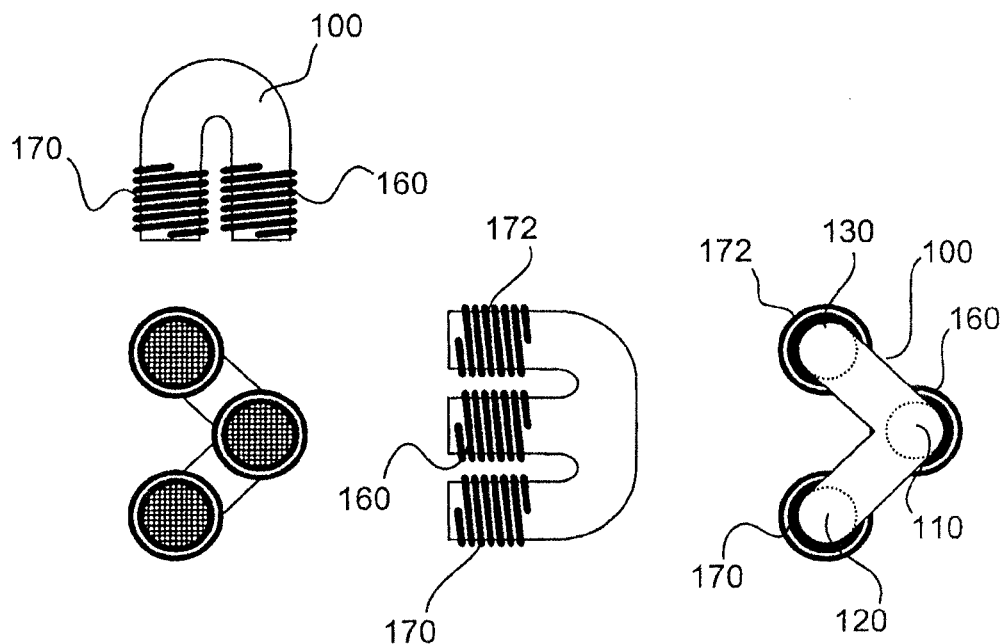
FIG. 2 shows a force measurement device.

FIG. 2 shows a flux concentrator 100 similar to that shown in FIG. 1, wherein in FIG. 2 the poles are shown at similar length to enable a better overview. A magnetic field generating unit 160 in the form of a coil is wound around the first pole 110. A first magnetic field sensing unit 170 in the form of a coil is wound around the second pole 120 and a second magnetic field sensing unit 172 in the form of a coil is wound around the third pole 130.

The force measurement device may particularly be a differential mode force measurement device and consists of a flux concentrator with at least three magnetic pole-ends, for example arranged in a 90 degree angle to each other. Around each pole-end are coils (inductors) wound. Most optimal sensor performances may be achieved when the inductors (coils) are placed nearest to the pole-end. This may minimize the magnetic performance losses caused by uncontrolled magnetic flux lines.

Figure 3:
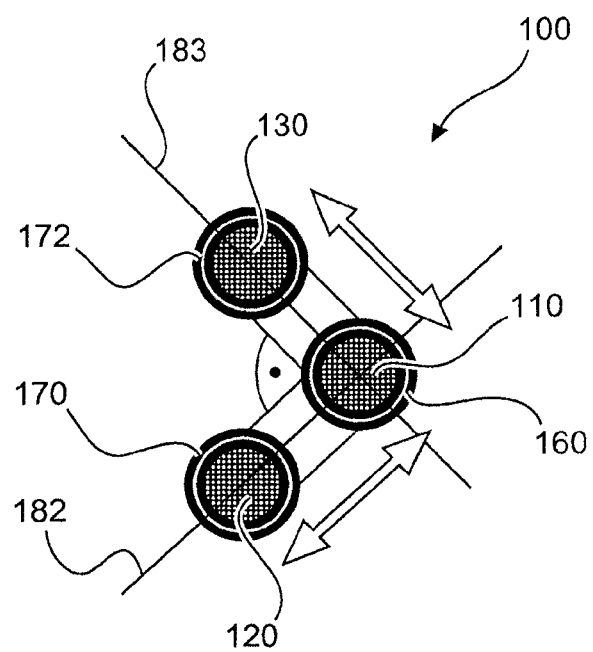
FIG. 3 shows a force measurement device.

FIG. 3 shows a bottom view of a flux concentrator 100. The flux concentrator is formed like an arrowhead. A first connection line 182 extends between the first pole 110 and the second pole 120. A second connection line 183 extends between the first pole 110 and the third pole 130. The first and second connection lines 182, 183 intersect at a predetermined angle, for example 90°.

In this specific embodiment, the centre pole-end of the flux concentrator (first pole 110) is where the magnetic field generator coil is placed. The magnetic signals are then received with the inductors (coils) wound around the second and third poles 120, 130. The number of turns, the physical length of the coil, and the material chosen for the flux concentrator itself defines the inductivity of the inductors.

Figure 4:
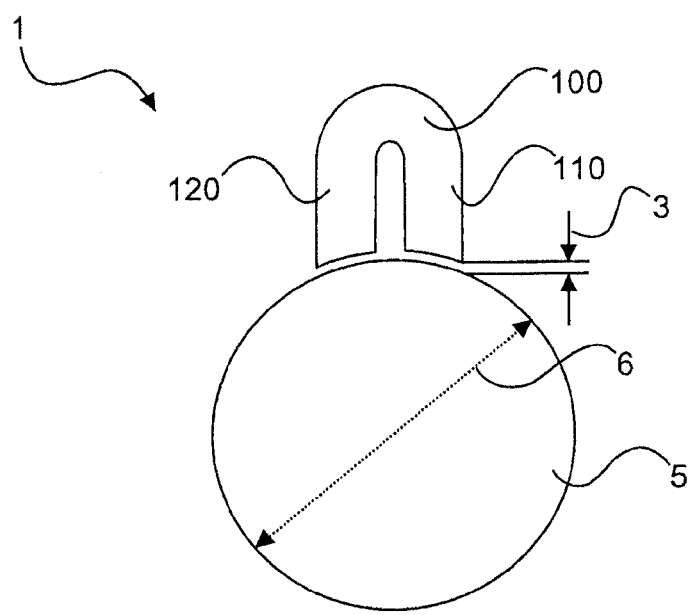
FIG. 4 shows a force measurement arrangement.

FIG. 4 shows a force measurement arrangement 1 with a force measurement device as described with reference to other embodiments herein. The flux concentrator 100 is arranged such that the pole ends are directed towards a test object 5, for example a shaft with a diameter 6. The flux concentrator is arranged such that the end faces of the poles are spaced apart at a virtually constant distance 3.

When placing the flux concentrator with flat-faced pole-ends against a round shaped Test-Object, then the spacing 3 or the distance between the flux concentrator and the Test-Object surface will increase at the edges of the flux concentrator. When the Test-Object is of round shape like a symmetrically shaped power dive shaft or gear-box shaft then it may be best to custom-shape the pole-ends as well. In such a case the spacing or distance will be more evenly and constant across the flux concentrator pole-ends and the surface of the Test-Object. A shorter distance between the Sensing Module and the Test-Object may increase the efficiency of the signal transfer between them both (more measurement signal and lower signal noise). Depending on the diameter 6 of the Test-Object, the 'shaping' of the pole-ends may be matched differently. Meaning that for different Test-Objects with different diameters, different and matching flux concentrators may be tooled.

Figure 5:
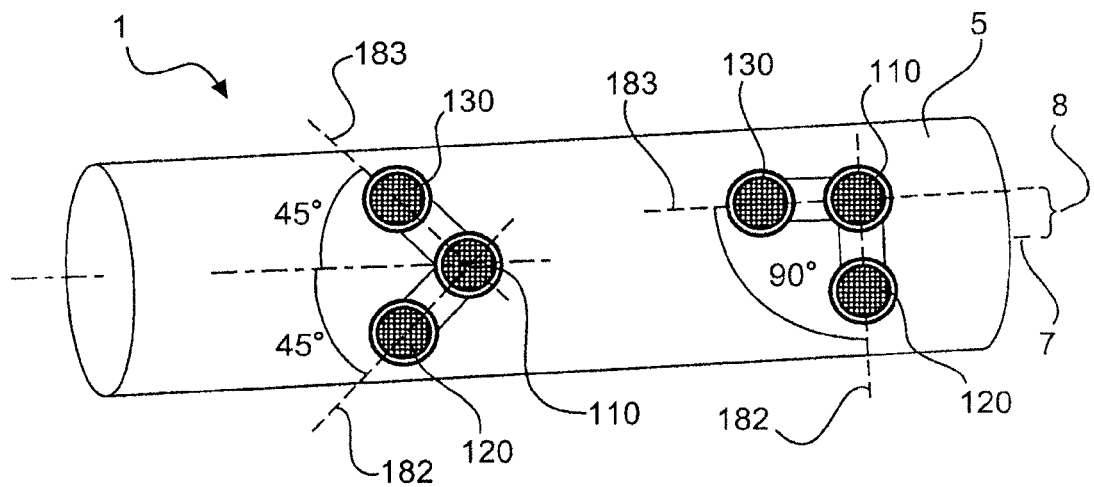
FIG. 5 shows configurations of a force measurement arrangement.

FIG. 5 shows a top view of two configurations of a force measurement arrangement.

On the left, a force measurement device is arranged such that the first pole 110 is directly above the longitudinal central axis 7 of the test object 5, i.e. there is no lateral offset between the longitudinal central axis 7 and the first pole 110 or a centre of the first pole 110. Each of the first connection line 182 and second connection line 183 intersects the longitudinal central axis at an angle of 45°. The connection lines 182, 183 intersect at 90°. This arrangement may particularly be advantageous when measuring torque forces applied to the test object.

On the right, a force measurement device is arranged such that the first pole 110 is laterally offset 8 relative to the longitudinal central axis 7 of the test object 5. The first connection line 182 intersects the longitudinal central axis 7 at an angle between 85° and 95°, i.e. substantially at 90°. The second connection line 183 is substantially parallel to the longitudinal central axis 7 and may intersect with the longitudinal central axis at an angle between 1° and 5°. This arrangement may particularly be advantageous when measuring bending forces applied to the test object.

The physical (rotational) orientation of the force measurement device in relation to the central axis of the Test-Object determines what forces will be measured by the force measurement device: Torque, Bending, or a mixture of both.

Figure 6:
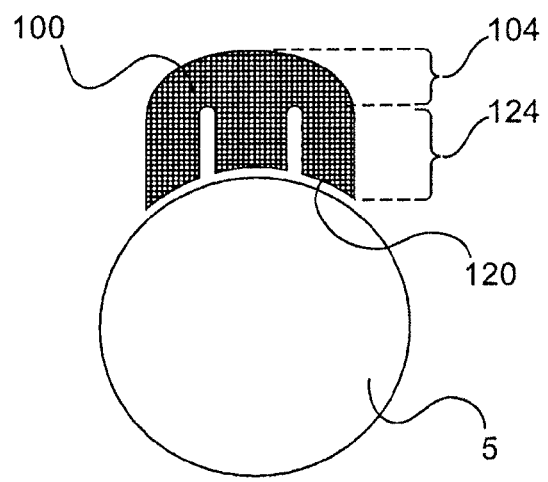
FIG. 6 shows a force measurement arrangement.

FIG. 6 shows a side view of a flux concentrator 100 relative to a round test object 5. It can be seen that the envelope of the poles' tips are adapted to the outer surface of the round test object.

In this case the sensor performance can be increased by shaping the pole-end-surfaces round such that not only the envelope is concave but also the end faces of the poles.

Figure 7:
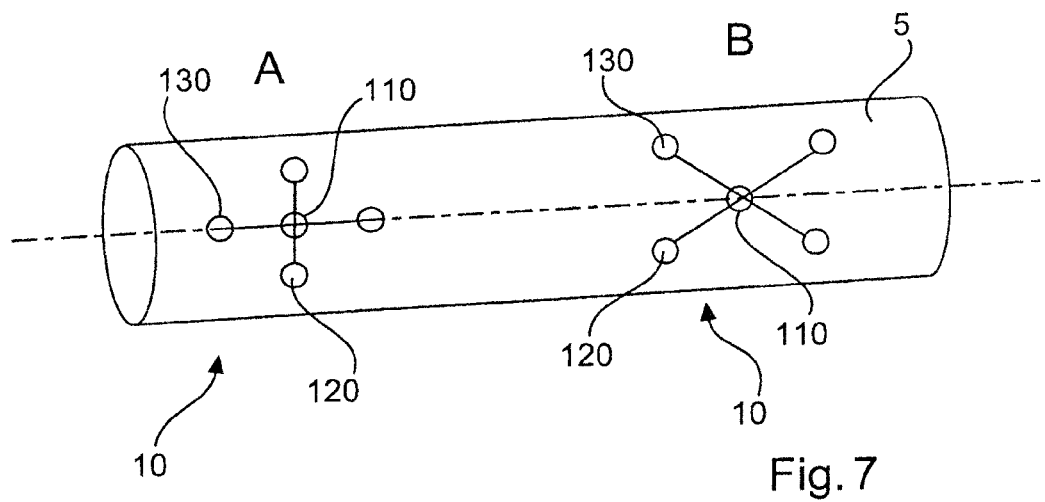
FIG. 7 shows configurations of a force measurement arrangement.

FIG. 7 shows alternative embodiments of a force measurement device 10, namely a five pole configuration. Similar to FIG. 5 there are at least two different configurations for placing the force measurement device relative to a test object. Configuration A is specifically adapted to measure bending forces (corresponds to the right hand configuration of FIG. 5). The first pole 110 may be laterally offset (as shown in FIG. 5) or may be aligned (FIG. 7, configuration A) with the longitudinal central axis of the test object. Configuration B corresponds the left hand configuration of FIG. 5 and is adapted for measuring torque forces.

Figure 8:
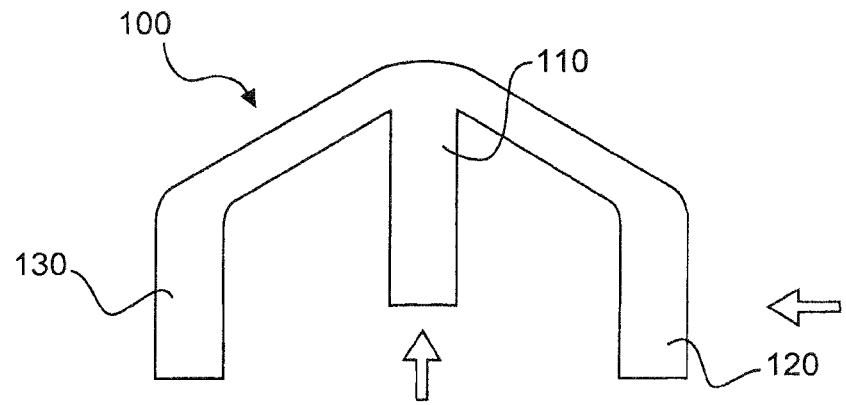
FIG. 8 is an isometric view of flux concentrator for a force measurement device.

FIG. 8 is an isometric view of a flux concentrator 100 with poles 110, 120, 130.

Figure 9:
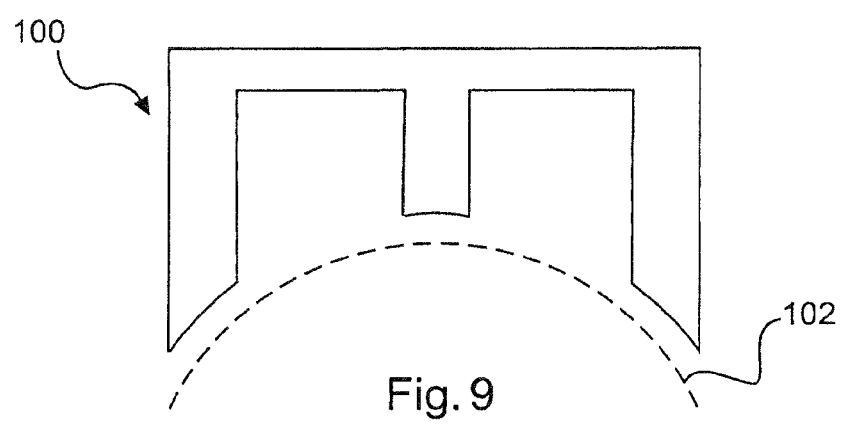
FIG. 9 shows a front view of the flux concentrator shown in FIG. 8.

FIG. 9 is a front view of the flux concentrator similar to that shown in FIG. 8 and viewed from a direction indicated by the arrow from below. The envelope 102 can be seen best in FIG. 9. In this embodiment, the first pole is shorter than the second and third poles. This flux concentrator is adapted for the arrangement for measuring torque forces.

Figure 9A:
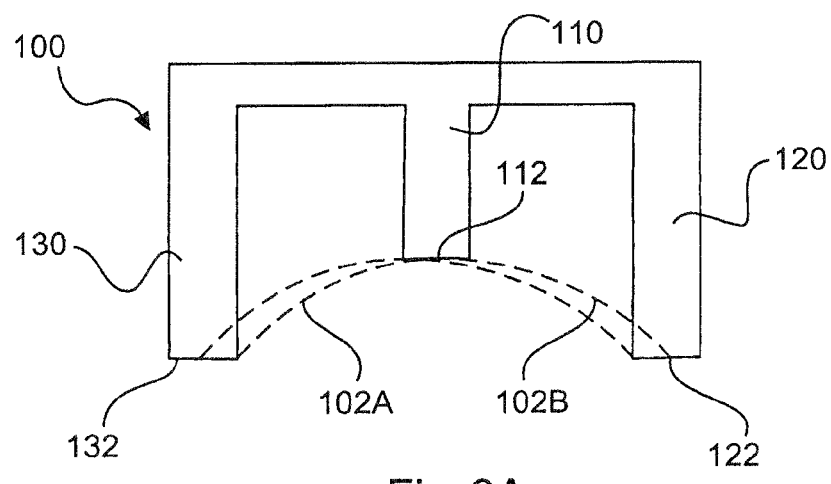
FIG. 9A shows a front view of an alternative flux concentrator.

FIG. 9A shows a flux concentrator having three poles 110, 120, 130, each of which comprises an end face 112, 122, 132, respectively. The end faces are flat and two different envelopes are shown with dashed lines. However, it can be seen that the envelope 102A, 102B are concave without the poles' end faces being concave shaped. The envelope 102A runs along edges of the end faces 122, 132 towards the end face 112 wherein the envelope 102B runs through a centre, for example a geometrical centre, of the end faces 122 and 132 towards the end face 112.

Figure 10:
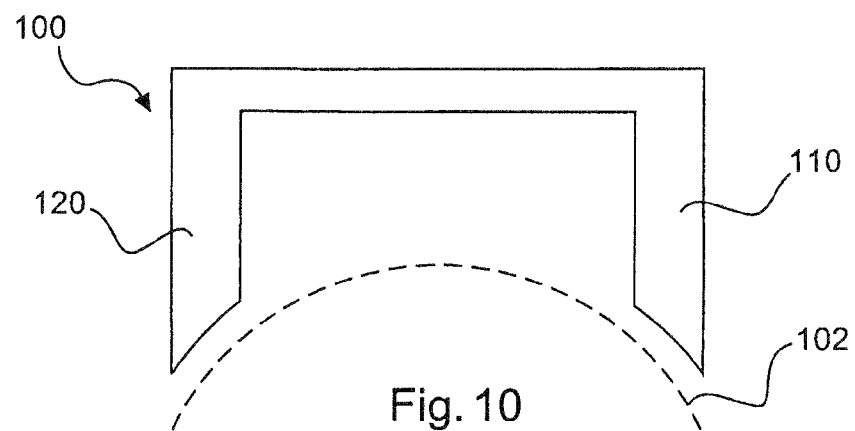
FIG. 10 shows a side view of the flux concentrator shown in FIG. 8.

FIG. 10 is a side view of a flux concentrator similar to that shown in FIG. 8 and viewed from a direction indicated by the arrow from the right. It can be seen that the second and third poles 120, 130 are aligned such that the third pole is obscured by the second pole. In this embodiment, the first and second poles have similar lengths. This flux concentrator is adapted for the arrangement for measuring bending forces.

Figure 11:
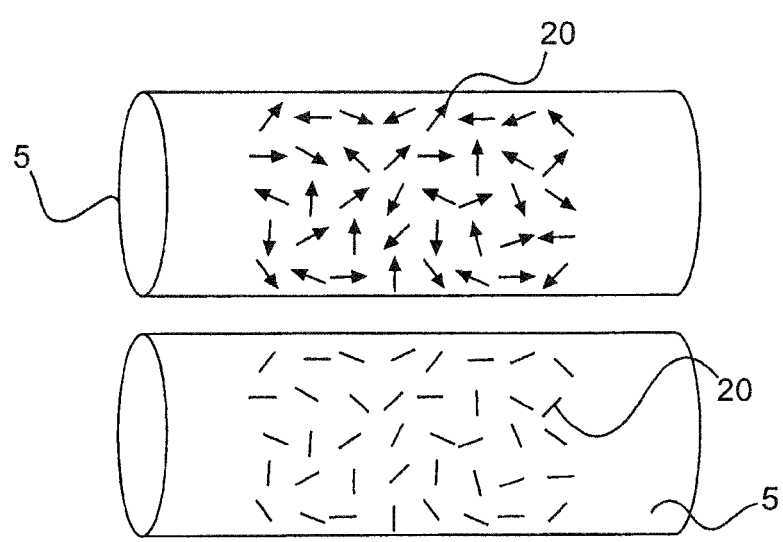
FIG. 11 shows an illustration for explaining the principle of the disclosure.

FIG. 11 shows a test object 5 with a multitude of magnetic domains for illustrating the measuring principles of the force measurement device described herein.

When applying mechanical stresses to a Ferro-magnetic Test-Object (like a power transmitting shaft), then a larger number of the magnetic domains within the Test-Object begin to align in the direction the mechanical stresses is running through the object. This is not necessarily a re-alignment of the magnetic polarity (North/South). Mainly, this is a re-alignment of the general magnetic axis within the magnetic domain independent to its magnetic polarity (direction).

The upper picture shows the random orientation of magnetic domains in a Ferro-magnetic object (here called: Test-Object, which can be a gear-box shaft for example) that has been degaussed and no mechanical stresses are applied to it. The magnetic domains point randomly in any possible direction (in this 2D paper format) whereby the arrow-head represents the magnetic North-pole of the individual magnetic domains. The lower picture shows only the main magnetic direction of the individual magnetic domain and the magnetic pole direction has been removed from this picture.

The general main magnetic directions shown in the upper picture and in the lower picture are identical. The only difference is that the magnetic polarity is not shown in the lower picture.

Figure 12:
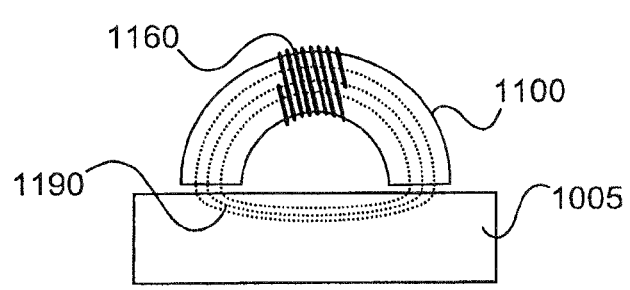
FIG. 12 shows an illustration for explaining the principle of the disclosure.
Figure 12:
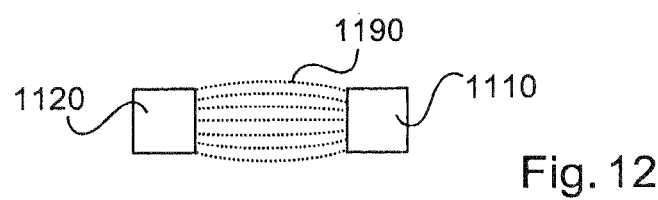

FIG. 12 illustrates the general function and principles of a magnetic force measurement device. The upper picture shows a side view wherein the lower picture shows a top view.

In this example, a two-pole flux concentrator 1110 with an inductor coil 1160 wound around it is shown. The inductor is a coil that is used to generate a magnetic field inside the flux concentrator. The flux concentrator (together with the magnetic field generating coil 1160) is then placed nearest the surface of a Ferro-magnetic object 1005 (here called: Test-Object). When the inductor is then powered by an electric signal source (DC or AC type of signal) then the electrically generated flux lines 1190 run in a close loop within the Flux-Concentrator and the Test-Object. For simplicity, the drawing shows only three of the stronger flux lines that are running in the center of the Flux-Concentrator.

Figure 14:
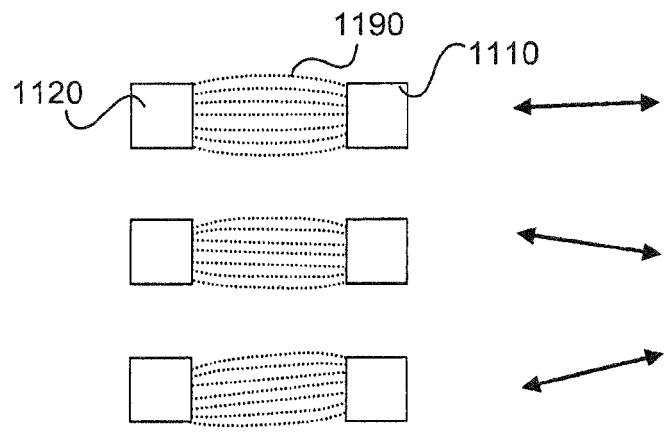
FIG. 14 shows an illustration for explaining the principle of the disclosure.

When mechanical stresses are applied to the Test-Object then the magnetic flux lines traveling from one pole-end to the other pole-end begin to tilt by some degree, as shown in FIG. 14. The stronger the applied mechanical forces are, the more tilting of the Flux Lines will result from it. The reason for the tilting of the Sensing-Module flux-lines has been explained before as the magnetic domains within the Test-Object start to re-align them as shown in FIG. 11 (in relation to the applied Torque or Bending forces).

Figure 13:
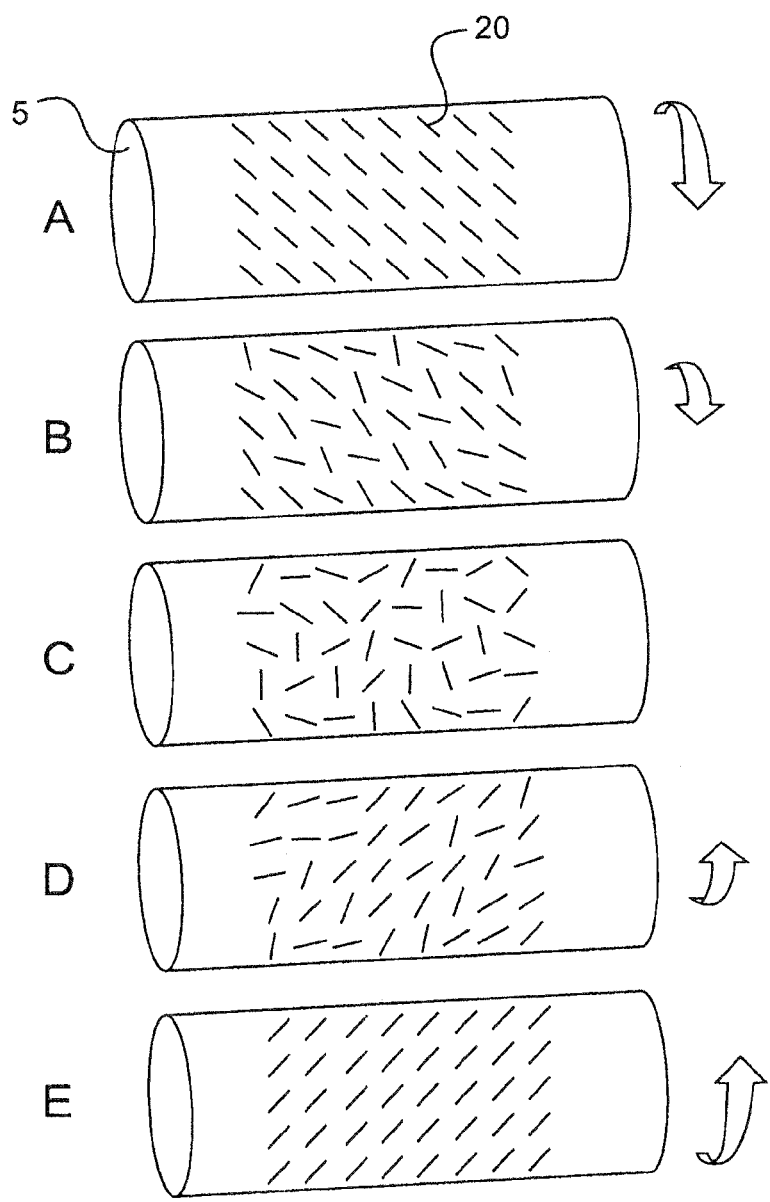
FIG. 13 shows an illustration for explaining the principle of the disclosure.

FIG. 13 illustrates the orientation of magnetic domains when applying a torque force depending on the direction and value of the applied forces.

The shown pictures A to E represent a Ferro-magnetic Test-Object. Picture C represents a mechanical stress-free situation, while the pictures A, B, D and E represent the situations when torque forces of different strength and in different directions (positive and negative Torque) are applied to the Test-Object.

Picture C demonstrates the orientation of the general magnetic orientation of the magnetic domains that are placed at, or are beneath the surface of the Test-Object, when no mechanical forces are applied to the Ferro-magnetic object and when the Test-Object has not been magnetised in some ways before. Meaning that the Test-Object (in picture C) shows a random and polarity-free orientation of the individual magnetic domains. Without any other externally generated magnetic field applied (that could act on the Test-Object), the Test-Object will act magnetically neutral to the outside world.

It should be noted that on a flat piece of paper as used for illustrating the figures only a two-dimensional picture of the orientations of the magnetic domains can be shown. In reality it is a three dimensional environment.

When applying a mechanical stress to the Test-Object (like torque forces) then the previously random oriented magnetic domains begin to fall-in-line with the direction of the mechanical stress-lines that are running through the Test-Object (in this case, when applying Torque forces: spiraling from one shaft end to the other shaft-end with a 45 degree angle with respect to the shafts main axis). The alignment of the magnetic domains to this 45 degree spiral angle is proportional to the applied Torque Stresses. The larger the applied Torque forces are, the larger the number of aligned magnetic domains will be. The maximum number of aligned magnetic domains (as shown in the pictures A and E) has been reach near the point where plastic deformation in the Test-Object will occur. Even when newly aligned, the re-oriented magnetic domains (triggered by the applied Torque Forces) will not cause that the Test-Object becomes magnetic to the outside world. To a larger extend, the Test-Object remains magnetically neutral (does not show a magnetic polarization of the Test-Object to the outside world) as the combined magnetic effect of the re-aligned magnetic domains is neutralizing themselves.

FIG. 14 shows the direction of the magnetic flux lines passing through a test object to which a force is applied. The upper picture shows the case where no mechanical stresses are applied to the test object and the arrow at the right indicates the direction of the magnetic flux lines. The middle picture shows the case where negative mechanical stresses are applied to the test object and the corresponding direction of the magnetic flux lines. The lower picture shows the case of applied positive mechanical stresses and is thus the reverse situation than that shown in the middle picture.

When mechanical stresses are applied to the Test-Object, then the flux lines created by the magnetic field generating unit will proportionally change their angular direction slightly in the way they run between the two pole-ends (here often called "magnetic field tilting"). This may be true only when the orientation of the two pole-ends of the Flux-Concentrator and the mechanical stress lines are aligned correctly to each other. When not aligned correctly then it may be possible that the magnetic flux-lines will not be affected by the applied mechanical forces or the force measurement device may not be able to detect the differences.

Figure 15:
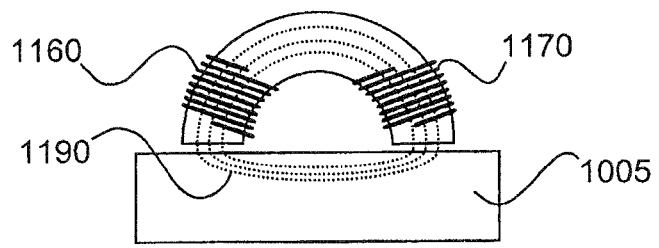
FIG. 15 shows an illustration for explaining the principle of the disclosure.

FIG. 15 shows a force measurement device similar to that shown in FIG. 12 with the difference that in FIG. 15 the force measurement device comprises a magnetic field sensing unit 1170.

With this additional inductor, namely with the magnetic field sensing unit 1170 wound around the same flux concentrator, the resulting effect of the magnetic flux-line-tilting can be detected and measured. However (in this specific example), the tilting of the flux-lines in different angular directions (positive or negative angle), will result in a reduction of the signal amplitude measured with the magnetic field sensing unit 1170, Meaning that the information about the polarity of the angular changes may get lost.

Figure 16:
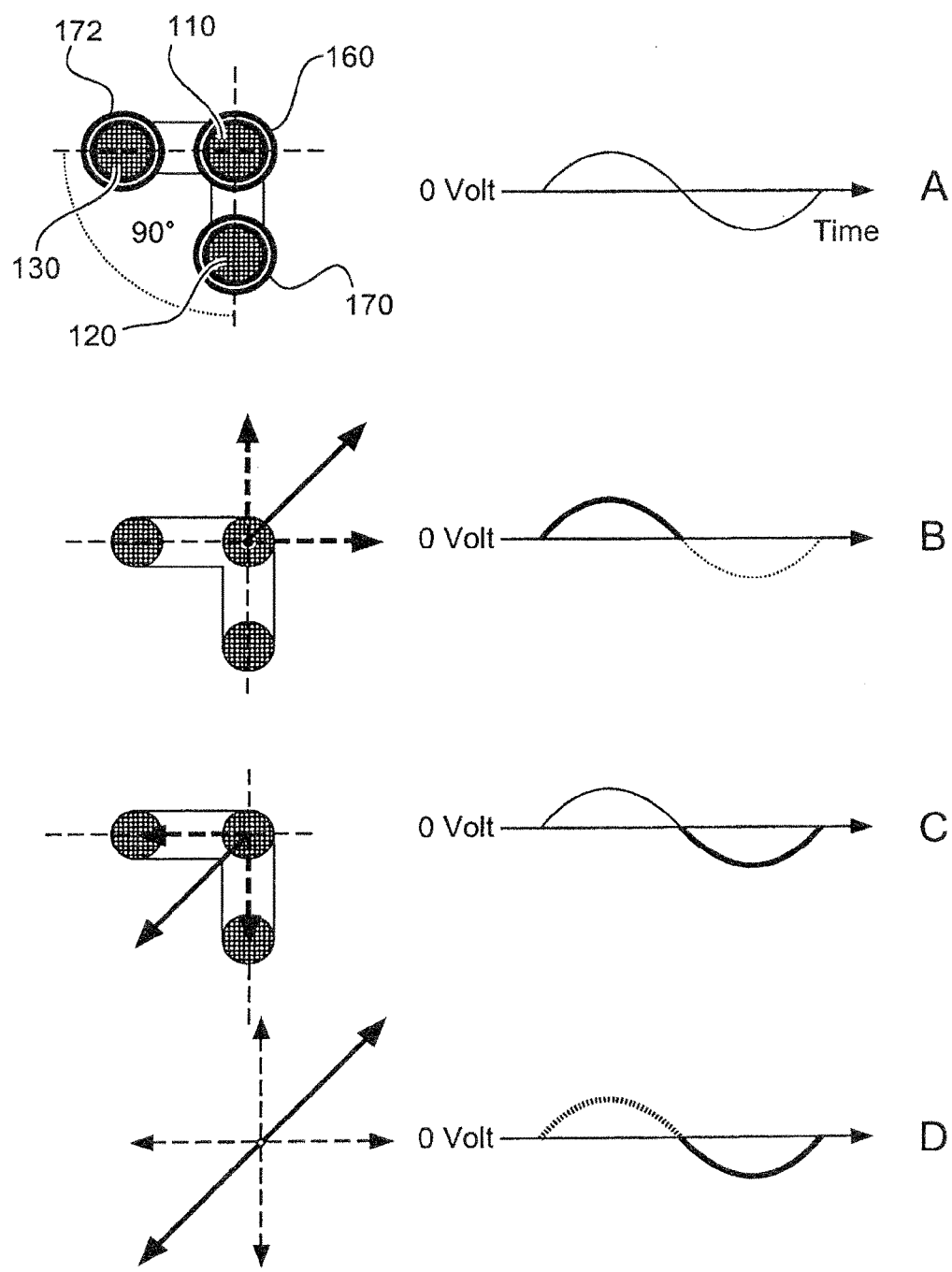
FIG. 16 shows steps of the signal analysis of a force measurement device.

Highest measurement efficiency may be achieved when the two coils are placed on separate pole-ends and nearest to the pole-end itself FIG. 16 shows an overview of the magnetic field sensing unit signal analysis.

A three pole-end Flux-Concentrator shown at the upper left corner allows to detect and measure the angular changes of the magnetic flux lines within the test-Object when mechanical forces, like Bending or Torque, are applied and the direction (polarity) in which the flux angle is changing representing positive and negative mechanical forces. From the two main possibilities available about how the force measurement device can be operated, the one where the magnetic field generating unit 160 is wound around the first pole 110 will described here in more detail. Two magnetic field sensing units 170, 172 are wound around the second and third pole, respectively.

In this example the magnetic field generator coil is powered by an AC (sin-wave) signal, as shown in picture A. When the magnetic field generating unit is driven by the positive wave of the driver signal (picture B), then the inductors sensing units 170, 172 receive an equally strong signal (identical signal amplitude, shown with the two dotted lines) in positive direction. Also shown in the picture B is the resulting signal vector (solid line with arrow end) when processing further the signals from the sensing units 170, 172.

Picture C shows the signal amplitude and signal polarity (dotted lines with arrow-ends) received at the sensing units 170, 172 when the signal generator coil is driven by the negative signal wave. Also shown is the resulting signal vector when processing further the signals from the sensing units (solid line with arrow-end).

Picture D shows that the two vectors (positive and negative vectors) are identical in amplitude (size) and going in opposite direction. When summing-up these two vectors a zero-signal will be the result of it.

Figure 17:
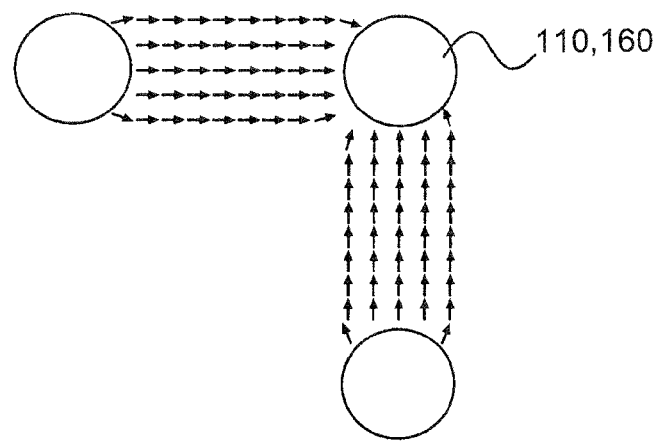
FIG. 17 shows an illustration for explaining the principle of the disclosure.
Figure 18:
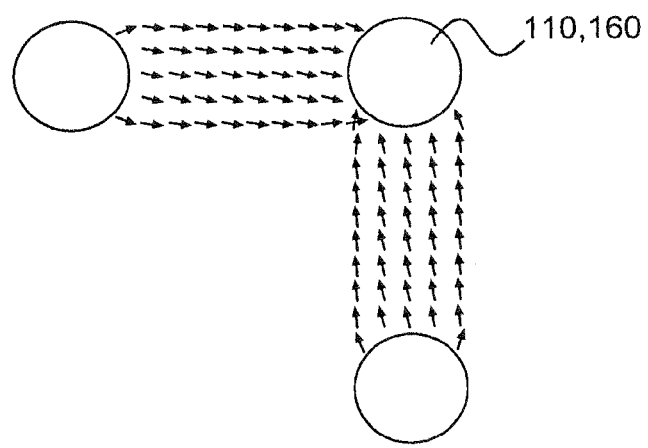
FIG. 18 shows an illustration for explaining the principle of the disclosure.

FIGS. 17 and 18 show the orientation of magnetic domains that are triggered by the magnetic field generating unit.

Orientation of the magnetic domains that are triggered by the magnetic field generator coil L5 and the 3-pole-end Flux-Concentrator. A number of the available magnetic domains (that built the surface of the Test-Object) will align their directions with the flux-lines that run between the pole-ends 1 and 5, and 2 and 5.

The number of magnetic domains that take part in this re-alignment will increase when increasing the magnetic field strength, generated by the magnetic field generator coil. FIG. 17 represents the state when no mechanical forces are applied to the Test-Object (mechanical stress free Ferro-magnetic material) and when the magnetic field generating coil is driven by an electric current in one specific direction.

The magnetic orientation of the magnetic domains will be influenced by the magnetic field generated by the magnetic field generating unit and by the mechanical stresses that are applied to the Test-Object. FIG. 18 shows that some mechanical forces are applied to the Test-Object, and therefore the magnetic domains are no longer pointing directly to the magnetic field generating unit. The direction of the magnetic domains may change by up to 180 degree angle when the signal polarity (electric driver current) in the magnetic field generating coil 160 is flipping over (also depending on the alloy used to tool the Test-Object).

Figure 19:
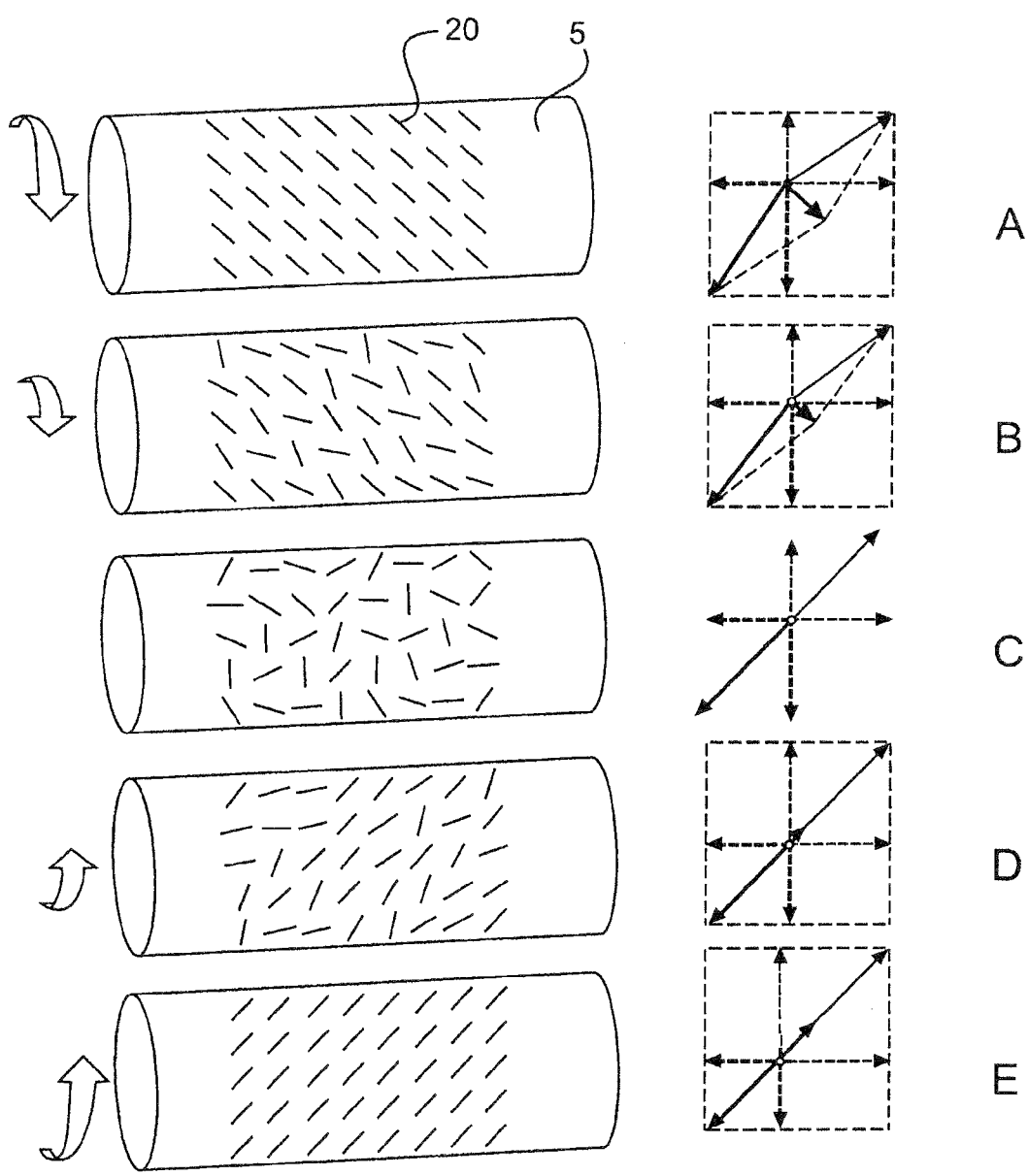
FIG. 19 shows scenarios of the signal analysis of a force measurement device

FIG. 19 shows steps of determining the forces applied to a test object.

The vector graphs at the right of the pictures A to E shows the resulting summing signal (when adding the positive and negative signal vectors), depending on the applied mechanical forces to the Test-Object. The short arrow represents the signal output of the force measurement device.

Figure 19A:
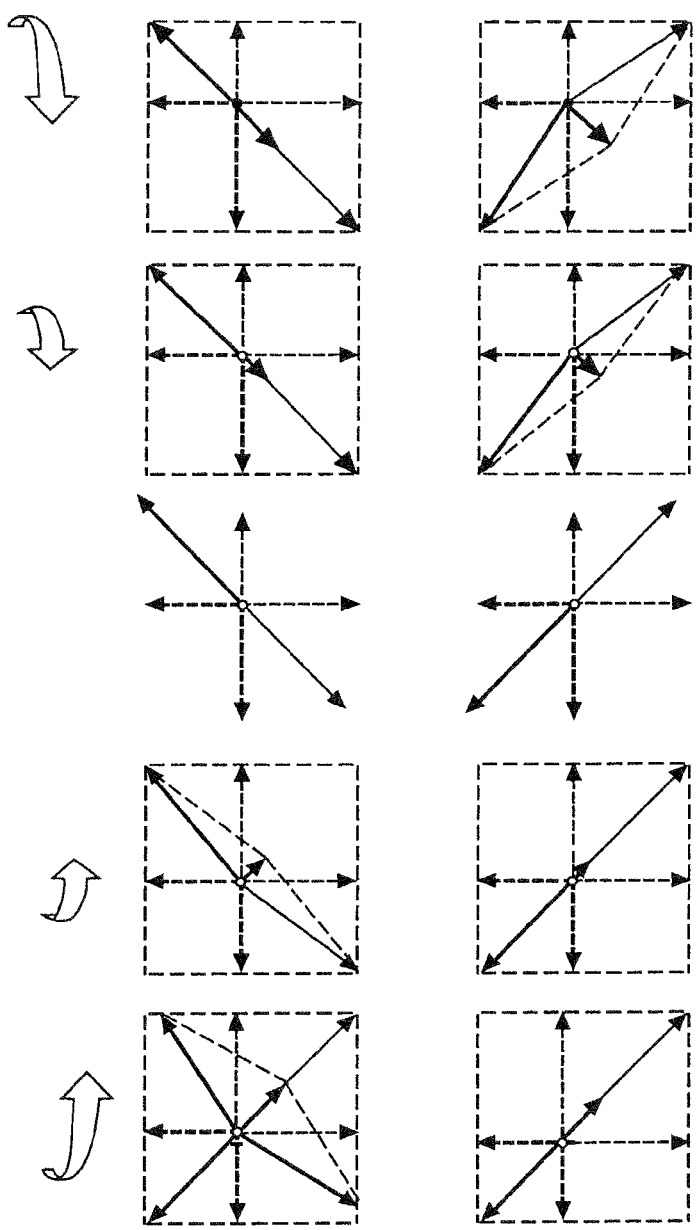
FIG. 19A shows scenarios of the signal analysis of a force measurement device.

When turning around the force measurement device relative to the test object by 90 degree angle the signal behavior may be the same, but the resulting analogue signal polarities may change, as shown in FIG. 19A.

Figure 20:
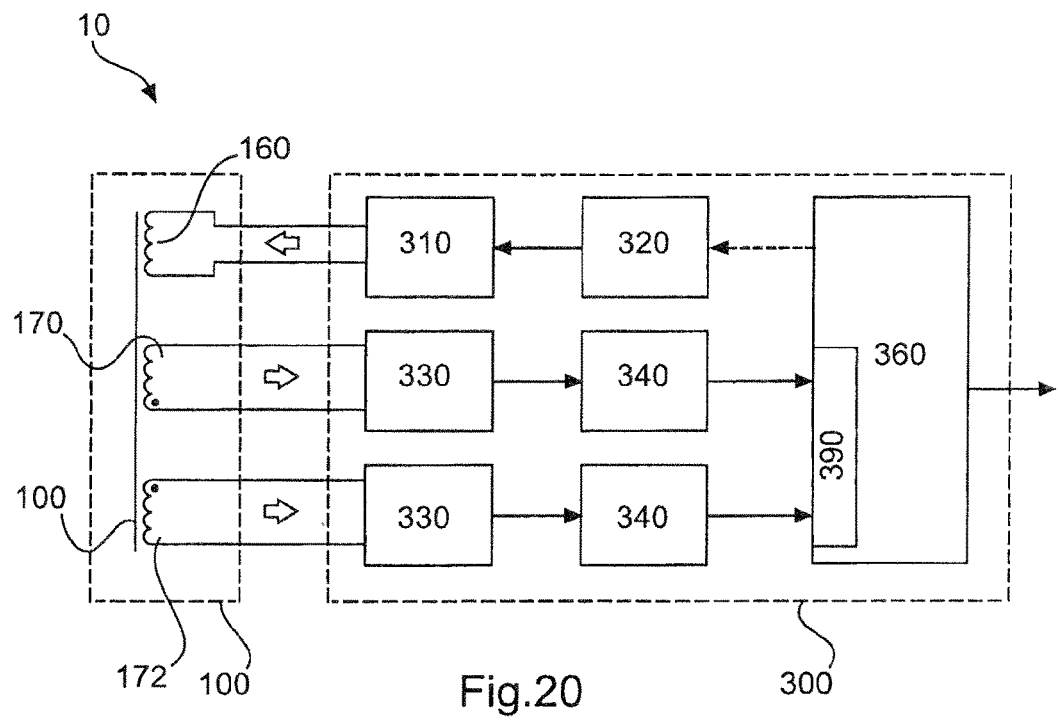
FIG. 20 shows a force measurement device.

FIG. 20 shows a force measurement device 10 with a flux concentrator 100 and a control unit 300.

The flux concentrator 100 comprises a magnetic field generating unit 160 and two magnetic field sensing units 170, 172. The control unit comprises a power driver 310 and a oscillator 320 both configured to provide an electrical signal to the magnetic field generating unit 160. The magnetic field sensing units 170, 172 are connected to a signal conditioning unit 330 and a signal processing unit 340, respectively. Thus, three branches are provided which are connected to an analogue-digital-converter 350 and/or to a microcontroller unit 360 which determines the force measurement device output signal.

The magnetic field generating coil is driven by an electric signal. This signal can be a DC (direct current) or it can be an alternating current (AC). The sensor performance may be significantly improved when using an AC signal. Therefor the Sensor Electronics includes an oscillator that can operate independently or can be adjusted by an on-board intelligence (like a micro controller, for example).

The operational frequency of the Sensing Module can be adjusted to any value above around 400 Hz and below 40,000 Hz. The optimal frequency may be defined by the chosen alloy of the Test-Object (Ferro-magnetic properties), the physical dimensions of the Test-Object (diameter or cross-section), the inductance of the coils (which is defined by the number of wire turns, the material chosen for the Flux Concentrator, and the physical dimensions of the Flux-Concentrator), the targeted sample rate of the Sensor System (updated measurements per second), and the spacing between the Sensing Module and the Test-Object.

The signals returning from the magnetic field sensing units may include a carrier signal (caused by the magnetic field generating coil) and an amplitude modulation of the carrier signal The signals received by the sensing coils are subtracted from each other and then corrected (by adding a signal offset and applying a multiplier which is a signal gain). The result is then further processed within the embedded MCU 360 (signal filtering, limit detector, etc.) before passing it on to the signal output.

The benefit of this sensor design solution may be that the sensing coils do not have to be identical. They can be different from each other in size and value. Any difference between them will result in a different signal gain and signal offset. These differences can be corrected by the Signal Processing modules that follows for each channel.

Alternatively (see FIG. 21) the sensing coils can be connected to each other in reversed order (subtracting from each other). The benefit of this embodiment is that it may simplify the Sensor Electronics (less complex and lower in cost). In this embodiment, the sensing coils may have to be identical and their placement in relation to the Test-Object may be of relevance.

Figure 21:
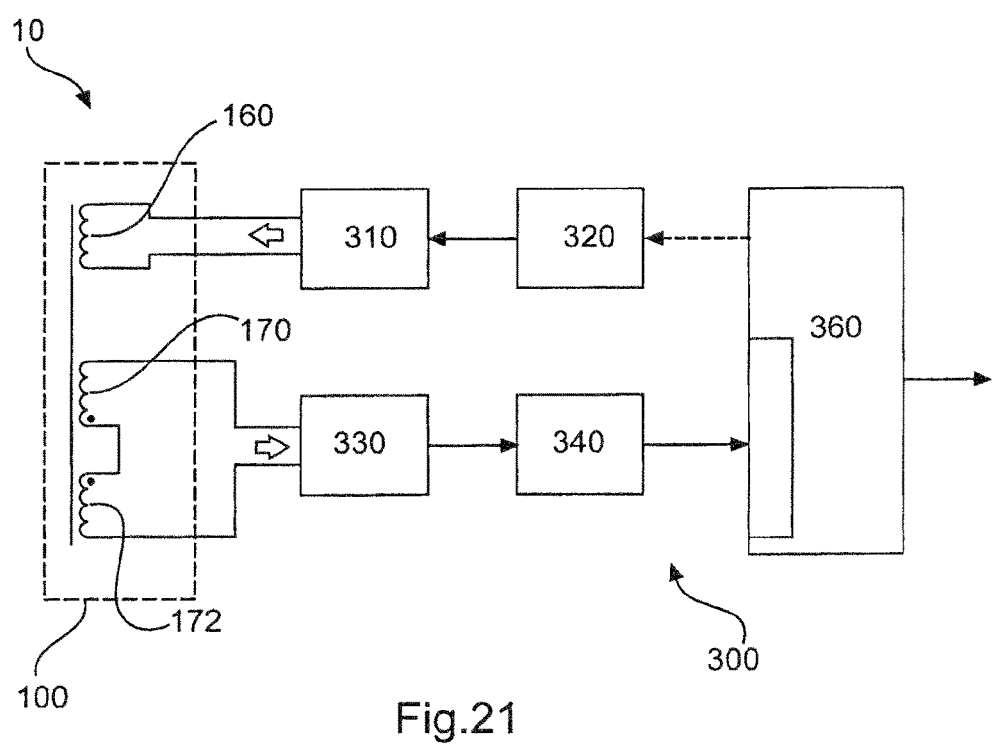
FIG. 21 shows a force measurement device.

When designing and producing the sensing coils identical in size and in value, then the signal difference between the signals received by them can be built by simple inverse serial connection of the two sensing coils. The benefit of this sensor design solution shown in FIG. 21 is that the sensor electronics may be simpler (lower complexity) and therefore smaller in size and lower in cost.

Figure 22:
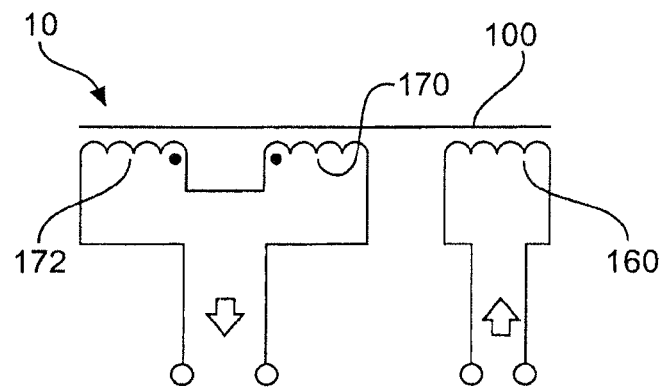
FIG. 22 shows a force measurement device.

FIG. 22 shows a design option of the force measurement device 10 with one magnetic field generating unit 160 and two magnetic field sensing units 170, 172.

Figure 23:
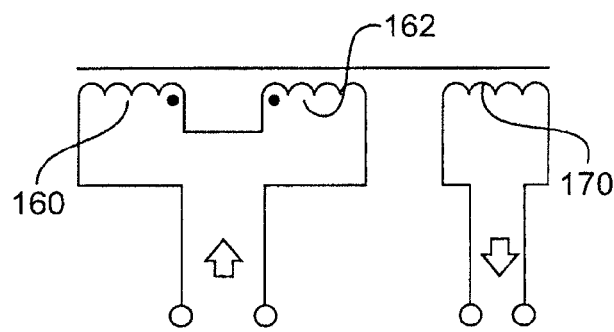
FIG. 23 shows a force measurement device.

Alternatively, as shown in FIG. 23, the force measurement device 10 may comprise two magnetic field generating units 160, 162 and one magnetic field sensing unit 170.

Figure 24:
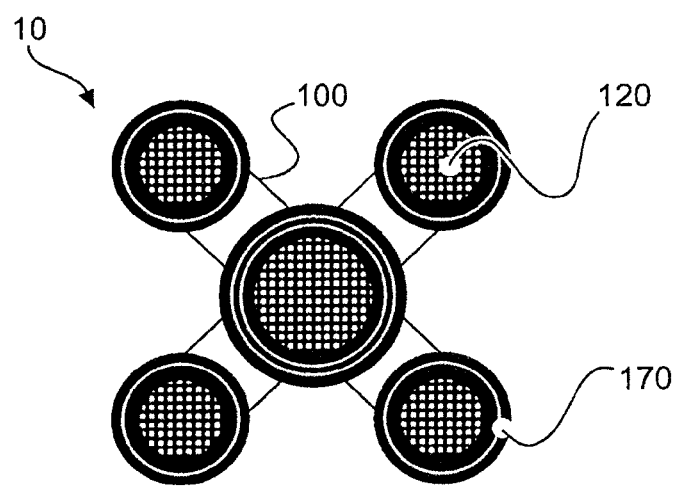
FIG. 24 shows a force measurement device.

FIG. 24 shows a force measurement device 10 with a five pole flux concentrator 100.

The Sensing Module consists of a flux concentrator that shows 5 pole-ends. Each pole-end includes an inductor (coil). Thus, there are five coils wound around each of the five pole ends. The centre pole-end may have a larger cross section than the other four pole-ends. In one embodiment, the cross section of the centre pole is equivalent of the cross section of two of the other pole-ends. This may assure that the magnetic flux runs evenly through the flux concentrator. The four coils (inductors) placed around the outer four pole-ends are connected to each other in series. The operational frequency of this sensor system ranges from 400 Hz to >20,000 Hz. The driver signal for the magnetic field generator coil can be rectangle. A design of the magnetic field generator coil (inductivity) may assure that the rectangle driver signal will result in a pseudo-sinus shaped current flow through the generator coil. The benefit may be lower emissions of interfering magnetic signals (limited or no harmonics). The Flux-concentrator may be tooled from one piece of Ferro-Magnetic material. This way there may be a very uniform and even magnetic flow in any directions (from the centre pole-end to the outer four pole-ends) with as little as possible magnetic flux leakage. The flux-concentrator can be produced using a rapid prototyping manufacturing equipment.

FIG. 24 shows a bottom view of the force measurement device, showing the five pole ends of the flux concentrator and the five coils placed onto them. The pole-end surface of the flux concentrator can touch the Test-Object surface. This may assure maximum efficiency of the force measurement device sensor system. However, in this specific case all five pole-ends may have to touch the Test-Object surface to assure symmetric signal (magnetic field) distribution. In some cases the flux concentrator may be mounted with some distance to the Test-Object surface. By doing so the Test-Object (shaft) can rotate freely in either direction without having t touch (scratch) the flux concentrator.

As pointed out in FIGS. 22 and 23 with reference to a three pole flux concentrator, there may be different configurations of the sensing and generating units. Two possible configurations of the five pole flux concentrator are shown in FIGS. 25 and 26.

Figure 25:
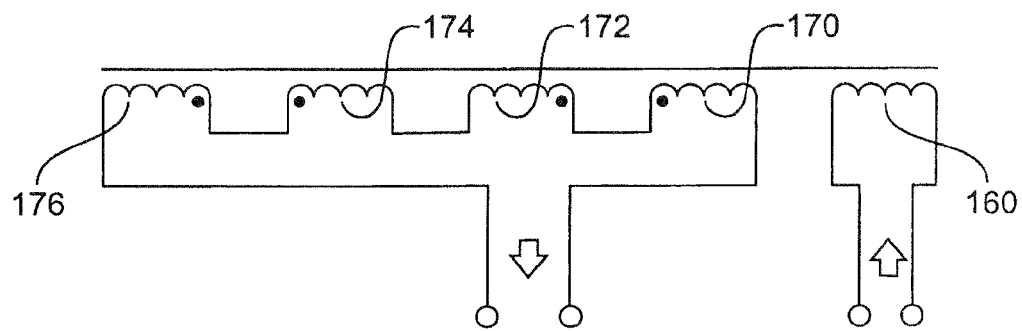
FIG. 25 shows a force measurement device.

FIG. 25 shows a design option of the force measurement device 10 with one magnetic field generating unit 160 and four magnetic field sensing units 170, 172, 174, 176.

Figure 26:
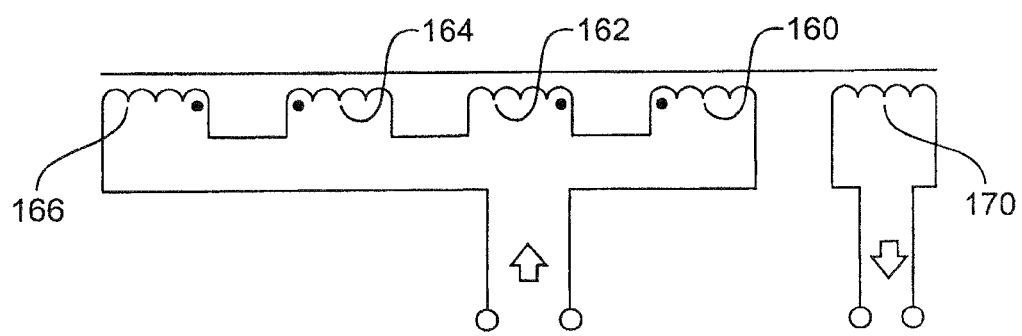
FIG. 26 shows a force measurement device.

Alternatively, as shown in FIG. 26, the force measurement device 10 may comprise four magnetic field generating units 160, 162, 164, 166 and one magnetic field sensing unit 170. The measurement signals gathered from the sensing coils 172 and 176 are compared with the measurement signals gathered from the sensing coils 170 and 174.

Figure 27:
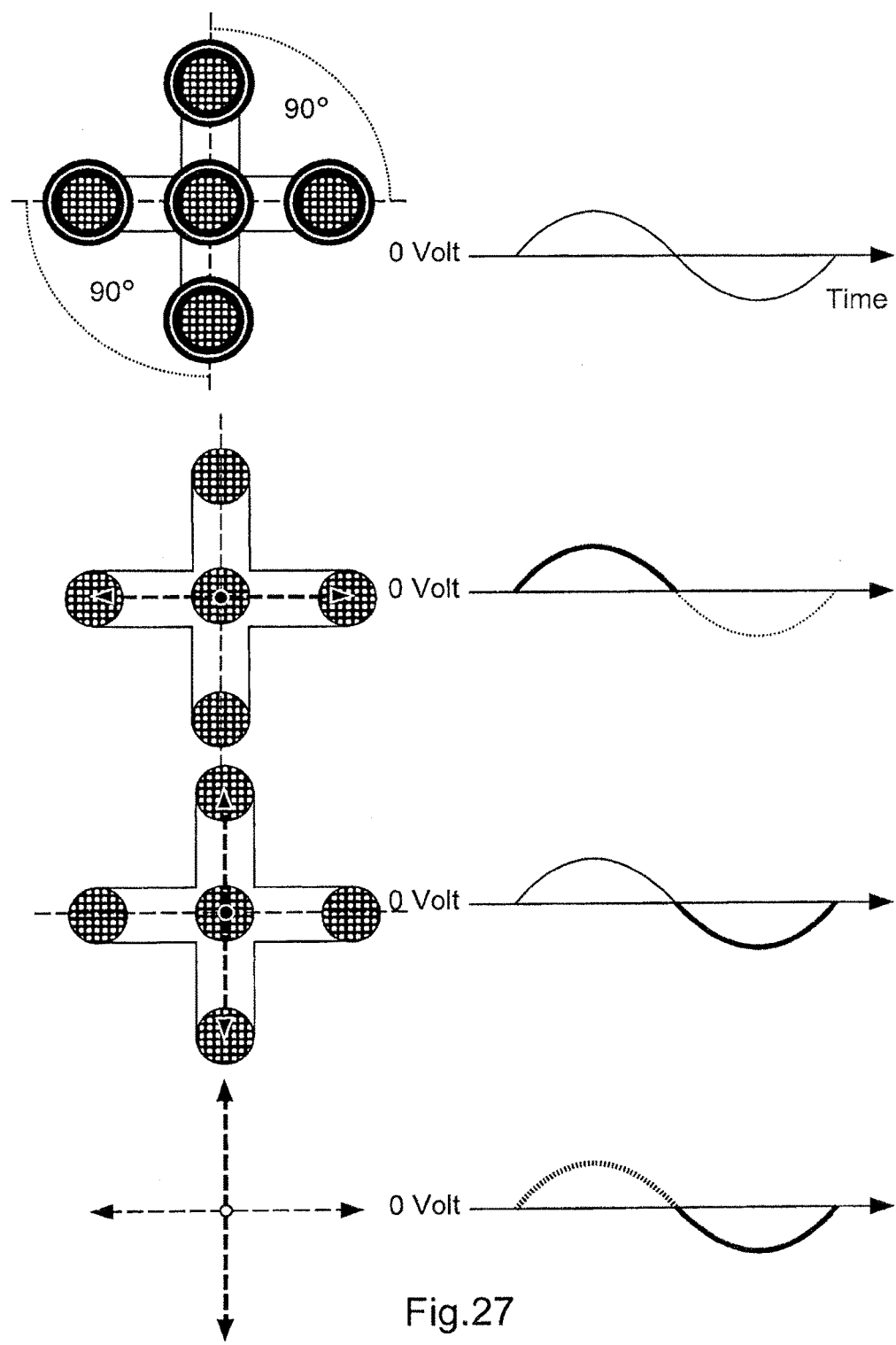
FIG. 27 shows steps of the signal analysis of a force measurement device.

FIG. 27 shows steps of the signal analysis when using a five pole flux concentrator. This is similar to the signal analysis described above with reference to FIG. 16.

Figure 28:
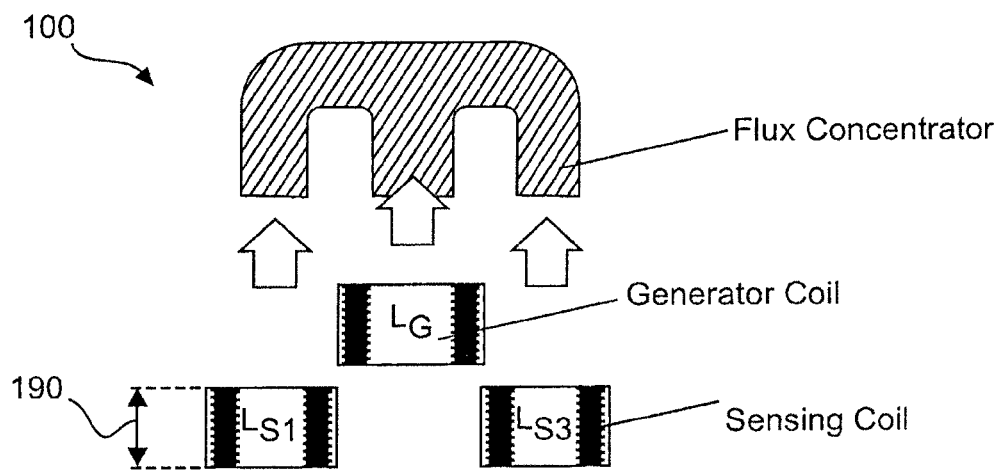
FIG. 28 shows a force measurement device.
Figure 29:
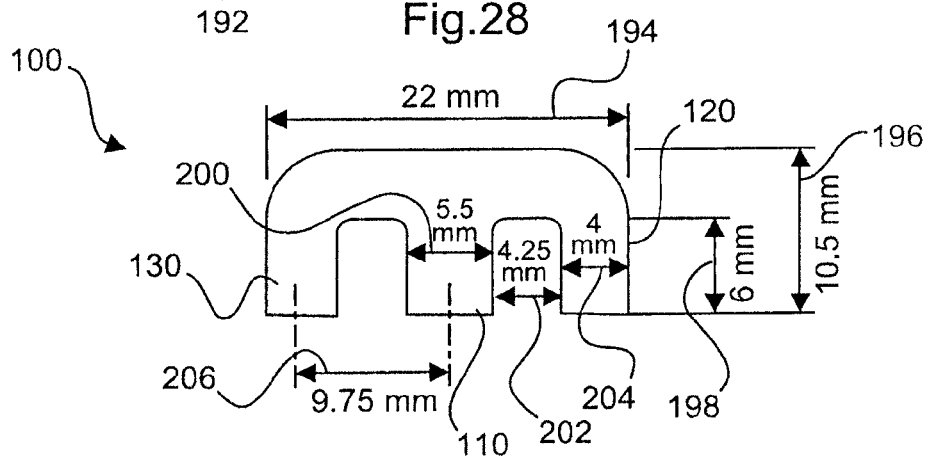
FIG. 29 shows a force measurement device.
Figure 30:
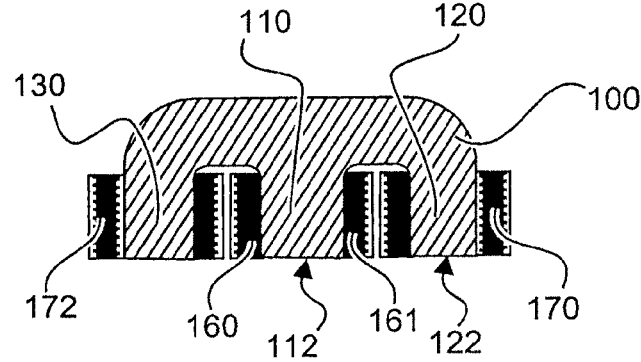
FIG. 30 shows a force measurement device.

FIGS. 28 to 30 show a flux concentrator 100 of a force measurement device with respective coils $L_G$ (generating coil, magnetic field generating unit) and $L_{S1}$, $L_{S2}$ (sensing coils, magnetic field sensing units).

In the flux concentrator design example shown in FIG. 28 the magnetic field generating coil is placed in the centre of the flux concentrator while the magnetic field Sensing Coils $L_{S1}$ to $L_{S2}$ are place at the outsides of the flux concentrator. The physical dimensions of the flux concentrator design are such that the path of the magnetic flux is kept as short as possible and that there are no unnecessary opportunities for the magnetic flux to go any other way then into the surface of the test-object. Therefore the flux concentrator is kept very short and there are no sharp edged corners (with the exception of the pole-ends).

The centre pole-end (for the coil $L_G$) may have about the same cross section (in $mm^2$) than the outer pole-ends combined. This way the magnetic flux density within the flux concentrator may be even and there may be no bottle-necks.

FIG. 29 shows an example a flux concentrator 100 design for a 25 mm diameter shaft (test object).

When looking from the side (cross section view) the flux concentrator pole arms may be nearly square shaped (ratio diameter versus length 1:1). The coil length 190 may be slightly shorter than the diameter 192 of the coil (for example, the ratio may be 1:0.66). A coil that is longer than its diameter will act increasingly more as a signal damping device.

The radial cross section of the individual arms of the flux concentrator may be round. Big losses may be expected when creating oval shapes or corner shapes (rectangle and square).

The spacings 202 between the vertical pole arms should be in the area of the cross section diameter 200, 202, 204 of the pole arms. Diverting from that rule may cost signal modulation losses. The maximum height 196 of the flux concentrator may be not much more than twice the coil length 190.

Preferably, the flux concentrator is made of one piece. The operational frequency of the generated alternating magnetic field is around 3 kHz to 4 kHz. At the upper end of the frequency, eddy current will dominate measurement signal dampening effects. The achievable air-gap (spacing) between the test object and the pole ends of the flux concentrator may be about 25% of the diameter of the flux concentrator or half the distance from pole-end-centre to pole-end-centre, indicated with reference numeral 206. In this example the useful measurement air-gap is about 9.75 mm/2=4.9 mm or less.

Figure 31:
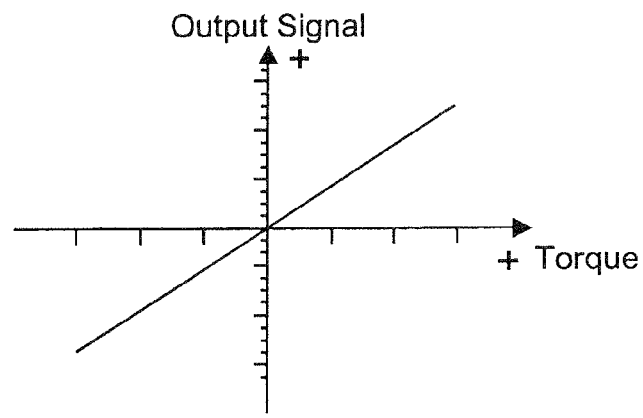
FIG. 31 shows an exemplary relation between the applied force and the output signal in a force measurement device.
Figure 32:
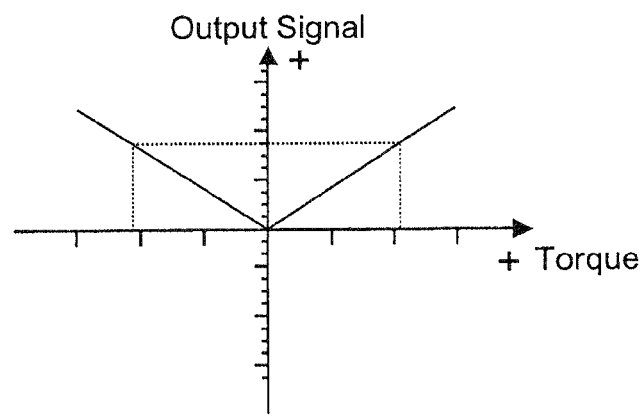
FIG. 32 shows an exemplary relation between the applied force and the output signal when using differential mode measurement in a force measurement device.
Figure 33:
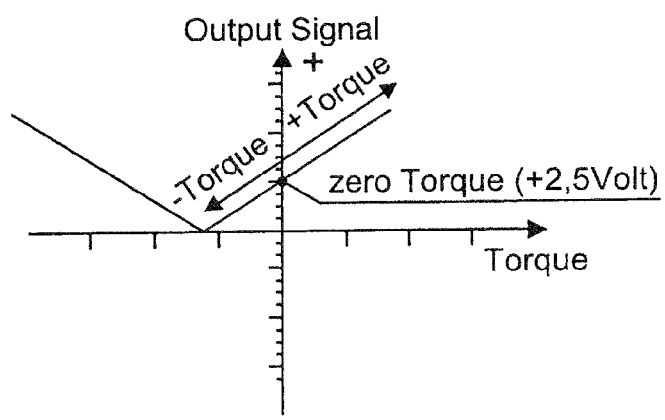
FIG. 33 shows the relation between the applied force and the output signal of a force measurement device.

FIGS. 31 to 33 describe a differential mode signal conditioning. A differential mode coil arrangement may be used in order to increase the effective signal amplitude modulation.

The signals received by the two sensing coils ($L_{S1}$ and $L_{S2}$) will be subtracted from each other.

$$L_S = L_{S1} - L_{S2}$$

Assuming that the physical design of both coils is identical and that the received signals (from the returned alternating magnetic field) are the same for both coils, then subtracting the signals from each other will result in 0 Volt.

This situation happens when no mechanical force is applied to the test-object. As soon as a mechanical force is applied to the test-object then the signal received on $L_{S1}$ and $L_{S2}$ will differ as the signal amplitudes move in opposite directions. In such circumstances (when applying a mechanical stress to the test-object) there will be a differential voltage after the signal voltage from $L_{S2}$ has been subtracted from the signal voltage from $L_{S1}$.

Best sensor system efficiency may be achieved when the effective inductivity of the generator coil and the effective inductivity of the in-series connected sensing coils (like: $L_{S1}+L_{S2}$+others) are closely matched. This will result in that the filter characteristic of $L_G$ (generator coil, magnetic field generating unit) and $L_S$ (sensing coil, magnetic field sensing unit, $L_{S1}$ $L_{S2}$+others) are similar or even the same.

A design where the sensing coils provide the same "absolute" signal amplitudes cannot determine the difference between a positive mechanical force and a negative mechanical force that is applied to the Test-Object. This sensing coil design measures the absolute increase of the mechanical force but not its direction and polarity.

Ideally, the measurement signal curve will allow positive and negative applied mechanical forces (for example torque forces) to be determined, as indicated in FIG. 31.

In case of differential mode measurement and when the pair of sensing coils are of the exact same specification (like the same inductivity and the same physical dimensions) then the output signal will look the same for positive and negative applied forces (like: torque). This scenario is indicated in FIG. 32 where it can be seen that the same output value (measured voltage signal, vertical axis) is achieved by applying forces having different directions, namely a positive and a negative torque.

By miss-matching the inductivities of the sensing coil pair, the reported zero point (when zero torque is applied) shifts up one side of the curve. This means that there will be an output signal (in this example: +2.5 Volt) when no torque is applied.

To be able to differentiate between positive and negative mechanical forces the sensing coils have to be slightly mismatched so that subtracting the values from each other will not result in a zero value (when no mechanical force is applied to the test-object).

By how much the coil parameters have to be mismatched may be decided by the targeted measurement range. When going for a measurement range that lies within the safety factor of 10 (FS=+/−SF10) then the inductivity mismatch may be around 1%. When aiming for a FS measurement range of safety factor 4 (FS=+/−SF4) then the inductivity mismatch between $L_{S1}$ and $L_{S2}$) may be around 2%. The first sensing coil may have 125 windings while the second sensing coil may have 123 windings. The generator coil may, in this case, have 250 windings or, in general, about as much windings as the sum of the windings of the sensing coils.

It should be understood that the description herein, while exemplarily given for one generator coil and at least two sensing coils, does apply in a similar manner to the scenario in which there is a single sensing coil and at least two generating coils. In this scenario, the explanations given above and hereinafter relating to the sensing coils apply to the generating coils and vice versa.

LIST OF REFERENCE SIGNS 1 force measurement arrangement
3 distance between flux concentrator and test object
5 test object
6 diameter
7 longitudinal central axis
8 lateral offset
10 force measurement device
20 magnetic domains
100 flux concentrator
102 envelope
104 base
110 first pole
112 first end face
114 length
120 second pole
122 second end face
124 length
130 third pole
132 third end face
134 length
140 fourth pole
142 fourth end face
150 fifth pole
152 firth end face
160 first magnetic field generating unit
161 lower end of the first magnetic field generating unit
162 second magnetic field generating unit
170 first magnetic field sensing unit
172 second magnetic field sensing unit
174 third magnetic field sensing unit
176 fourth magnetic field sensing unit
182 first connection line between first and second pole
183 second connection line between first and third pole
184 third connection line between first and fourth pole
185 fourth connection line between first and fifth pole
190 height of a coil
192 diameter of a coil
194 width of the flux concentrator
196 height of the flux concentrator
198 height of a pole
200 diameter of the first pole
202 spacing between the first and second pole
204 diameter of the second pole
206 distance between the centre line of the third and first pole
300 control unit
310 power driver
320 oscillator
330 signal conditioning unit
340 signal processing unit
350 analogue-digital-converter
360 microcontroller unit
1005 test object
1100 flux concentrator
1110 first pole
1120 second pole
1160 magnetic field generating coil
1170 magnetic field sensing coil
1190 magnetic flux lines

The invention claimed is:

1. A force measurement device, comprising:
a first magnetic field generating unit configured to generate a magnetic field for being applied to a test object;
a first magnetic field sensing unit configured to sense the generated magnetic field;
a second magnetic field sensing unit configured to sense the generated magnetic field;
a flux concentrator having a first pole, a second pole and a third pole; and a control unit, wherein the first pole, the second pole and the third pole extend in the same direction, wherein the first magnetic field generating unit is arranged at the first pole, wherein the first magnetic field sensing unit is arranged at the second pole, wherein the second magnetic field sensing unit is a coil wound around the third pole, wherein a line enveloping a first end face of the first pole, a second end face of the second pole and a third end face of the third pole is concave shaped, wherein the control unit is adapted to deteimine a force applied to a test object based on the sensed magnetic field, wherein a cross section of the first pole is greater than a cross section of the second pole and greater than a cross section of the third pole, and wherein the flux concentrator interconnects the first pole, the second pole, and the third pole in a V-shaped manner, so that a first connection line between the first pole and the second pole and a second connection line between the first pole and the third pole intersect at an angle between 80° and 100°.

2. The force measurement device according to claim 1, wherein the line enveloping the first, second and third end face is circular.

3. The force measurement device according to claim 1, wherein at least one of the first end face, the second end face and the third end face is concave shaped.

4. The force measurement device according to claim 1, wherein the cross section of the first pole is equal to the sum of the cross sections of the second pole and the third pole.

5. The force measurement device according to claim 1, wherein a height of the first magnetic field generating unit is smaller than a diameter of the first magnetic field generating unit.

6. The force measurement device according to claim 5, wherein the height of the first magnetic field generating unit is between 60% and 75% of the diameter of the first magnetic field generating unit.

7. The force measurement device according to claim 1, wherein a spacing between the first pole and the second pole is equal to or larger than the diameter of the second pole.

8. The force measurement device according to claim 1, wherein a spacing between the first pole and the second pole is equal to or smaller than the diameter of the first pole.

9. The force measurement device according to claim 1, wherein a height of the first pole is between 50% and 75% of a height of the flux concentrator.

10. The force measurement device according to claim 1, wherein one end of the first magnetic field generating unit is spaced apart from the end face of the first pole between 0 mm and 3 mm.

11. The force measurement device according to claim 1, wherein one end of the first magnetic field generating unit is flush with at least a section of the circumference of the first pole at the end face of the first pole.

12. The force measurement device according to claim 1, wherein a height of the first magnetic field generating unit is between 40% and 60% of a height of the flux concentrator.

13. The force measurement device according to claim 1, wherein the height of the first magnetic field generating unit is 50% of the height of the flux concentrator.

14. The force measurement device according to claim 1, wherein the first magnetic field sensing unit is a first coil, and wherein an inductivity of the first coil is different from an inductivity of the second coil.

15. The force measurement device according to claim 14, wherein the first coil comprises between 1% and 3% more windings than the second coil.

* * * * *